(12) United States Patent
Tahir et al.

(10) Patent No.: US 11,592,285 B2
(45) Date of Patent: Feb. 28, 2023

(54) MODULAR INSPECTION SYSTEM FOR MEASURING AN OBJECT

(71) Applicant: FARO Technologies, Inc., Lake Mary, FL (US)

(72) Inventors: Muhammad Umair Tahir, Stuttgart (DE); Oliver Zweigle, Stuttgart (DE); Mark Brenner, Asperg (DE); Michael Müller, Stuttgart (DE); Simon Raab, Santa Barbara, CA (US); Steffen Kappes, Oedheim-Degmarn (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 748 days.

(21) Appl. No.: 16/541,774

(22) Filed: Aug. 15, 2019

(65) Prior Publication Data

US 2021/0048291 A1    Feb. 18, 2021

(51) Int. Cl.
    *G01B 11/25*    (2006.01)
(52) U.S. Cl.
    CPC ................. *G01B 11/2545* (2013.01)
(58) Field of Classification Search
    CPC .................................................. G01B 11/2545
    See application file for complete search history.

(56) References Cited

U.S. PATENT DOCUMENTS

| | | | |
|---|---|---|---|
| 5,589,942 A | 12/1996 | Gordan | |
| 8,830,485 B2 | 9/2014 | Woloschyn | |
| 8,970,823 B2 | 3/2015 | Heidemann et al. | |
| 9,115,986 B2 | 8/2015 | Heidemman et al. | |
| 9,218,637 B2 | 12/2015 | Thakkar et al. | |
| 9,599,455 B2 | 3/2017 | Heidemann et al. | |
| 9,602,811 B2 | 3/2017 | Hillebrand et al. | |
| 9,671,221 B2 | 6/2017 | Ruhland et al. | |
| 9,693,040 B2 | 6/2017 | Hillebrand et al. | |
| 9,769,463 B2 | 9/2017 | Hillebrand et al. | |
| 10,535,146 B1 * | 1/2020 | Buibas | G06Q 20/208 |
| 2015/0015701 A1 | 1/2015 | Yu | |
| 2015/0042759 A1 | 2/2015 | Heidemann et al. | |
| 2015/0254819 A1 | 9/2015 | Hara | |
| 2016/0073091 A1 | 3/2016 | Hillebrand et al. | |
| 2017/0111578 A1 * | 4/2017 | Eromäki | H04N 5/23245 |
| 2017/0191822 A1 * | 7/2017 | Becker | G01B 21/042 |
| 2018/0224270 A1 * | 8/2018 | Wolke | G01S 7/4865 |
| 2018/0321383 A1 | 11/2018 | Heidemann et al. | |

* cited by examiner

*Primary Examiner* — Hesham K Abouzahra
(74) *Attorney, Agent, or Firm* — Cantor Colburn LLP

(57) ABSTRACT

Aspects of the present disclosure provide a system for measuring an object, the system including a plurality of frame segments. The frame segments are configured to mechanically couple together to form a frame. The plurality of frame segments includes a plurality of measurement device link segments and each of the plurality of measurement device link segments includes a measurement device which together form a plurality of measurement devices having a field of view within or adjacent to the frame. Each of the plurality of measurement devices is operable to measure three-dimensional (3D) coordinates for a plurality of points on the object. The system further includes a computing device to receive data from the plurality of measurement devices via a network established by the plurality of measurement device link segments.

15 Claims, 30 Drawing Sheets

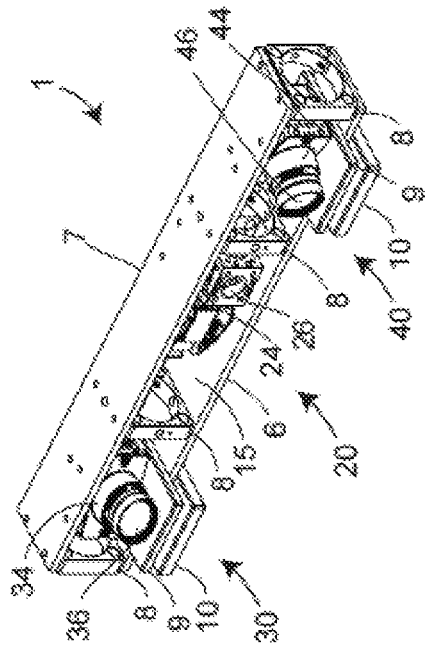
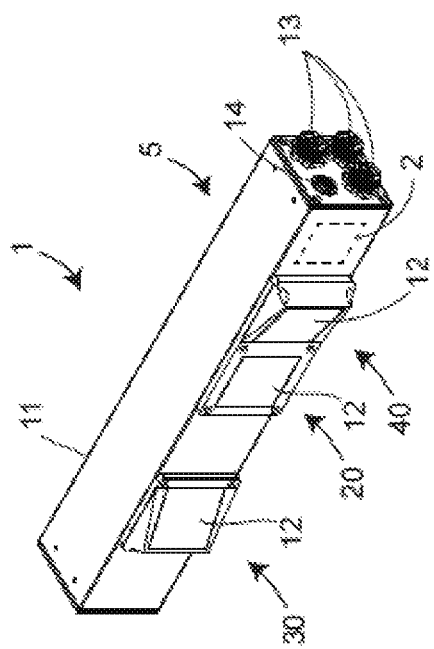
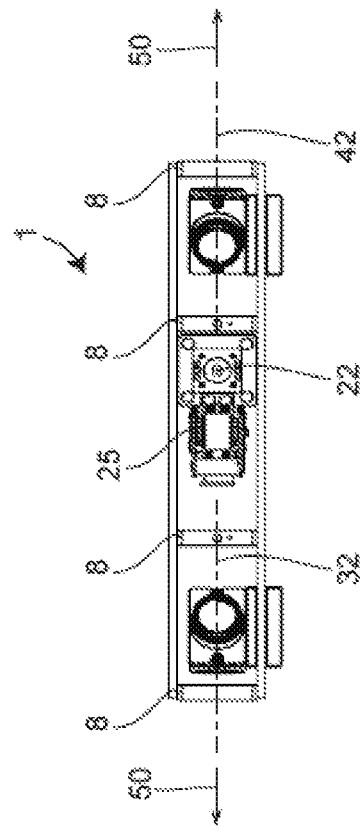
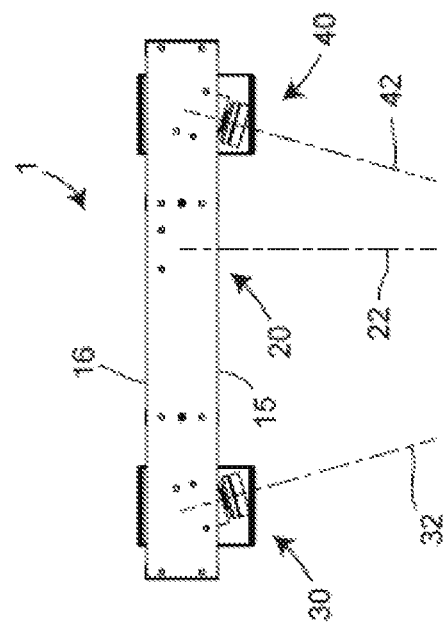

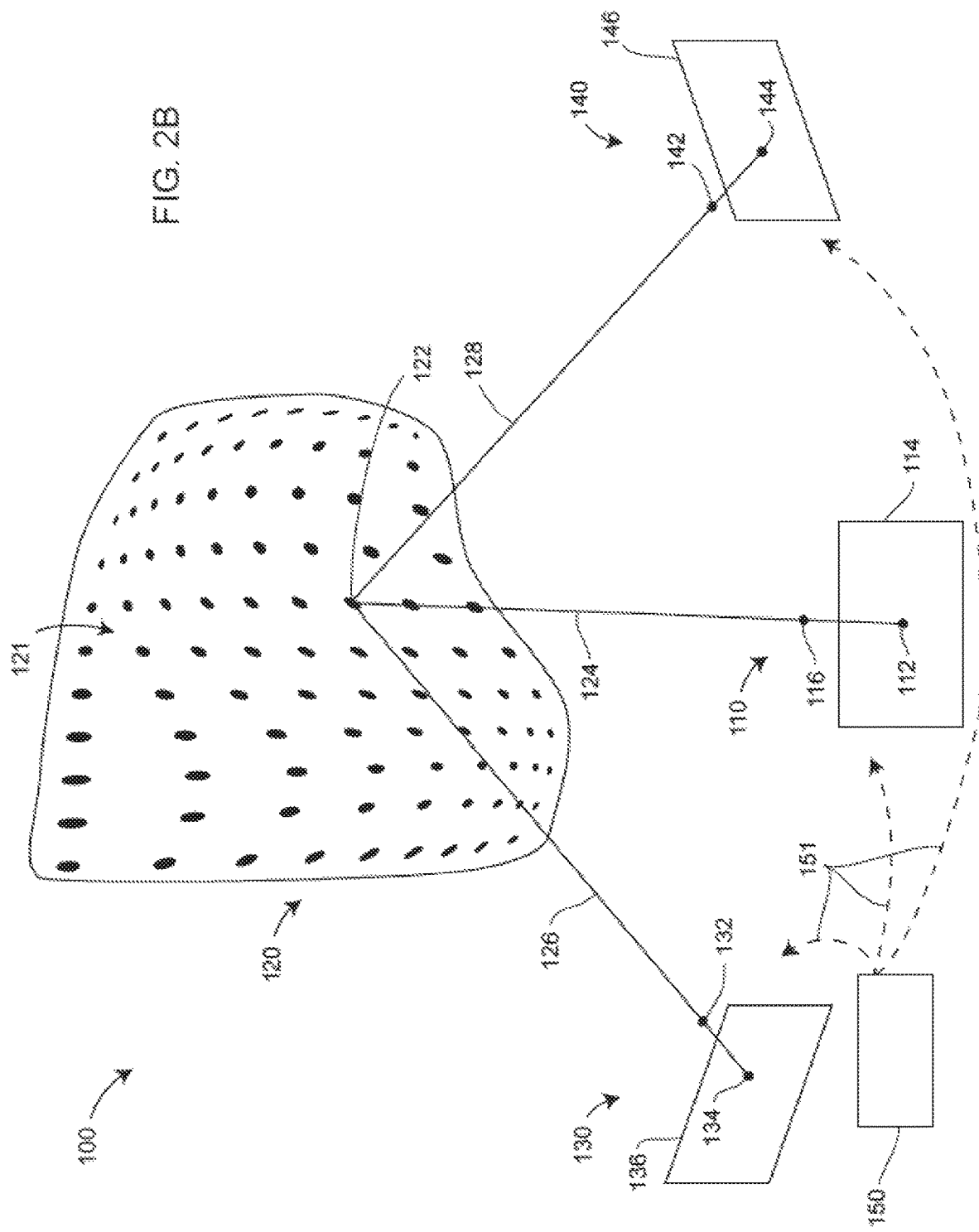

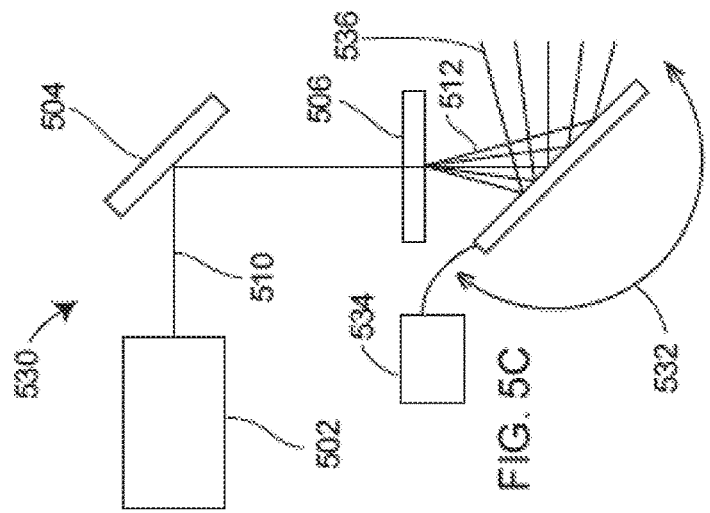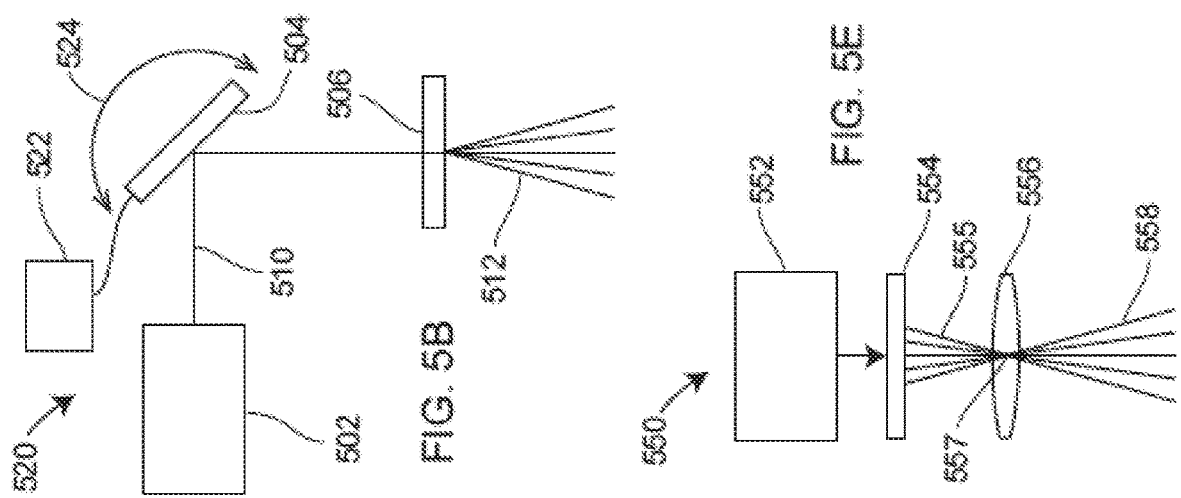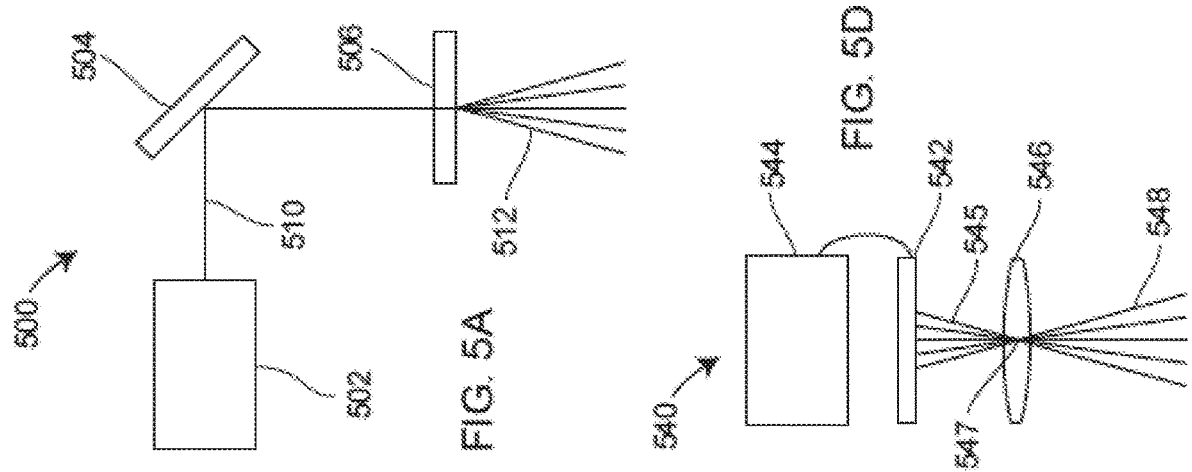

2000

```
┌─────────────────────────────────────────────────────┐
│ Arranging A Plurality Of Frame Segments To Form A First │
│ Frame Having A First Shape, The Plurality Of Frame     │
│ Segments Comprising A Plurality Of Measuring Device   │
│ Segments And A Plurality Of Joint Link Segments, Each Of│
│ The Plurality Of Measuring Device Segments Comprising A│
│ Measuring Device Which Together Form A Plurality Of   │
│ Measuring Devices Having A Field Of View Within Or    │
│ Adjacent To The First Frame, Each Of The Plurality Of │
│ Measuring Devices Being Operable To Measure Three-    │
│ dimensional (3D) Coordinates For A Plurality Of Points On An│
│ Object                                                │
│                                                  2002 │
└─────────────────────────────────────────────────────┘
                          ↓
┌─────────────────────────────────────────────────────┐
│ Establishing A Network Among The Plurality Of Frame  │
│ Segments When The Frame Segments Are Arranged In The │
│ First Shape To Transmit Data To A Computing Device   │
│                                                  2004│
└─────────────────────────────────────────────────────┘
                          ↓
┌─────────────────────────────────────────────────────┐
│ Receiving, By The Computing Device, Data From The    │
│ Plurality Of Measuring Devices Via The Network Established│
│ By The Plurality Of Frame Segments When The Plurality Of│
│ Frame Segments Are Arranged In The First Shape   2006│
└─────────────────────────────────────────────────────┘
                          ↓
┌─────────────────────────────────────────────────────┐
│ Rearranging The Plurality Of Frame Segments To Form A│
│ Second Frame Having A Second Shape                   │
│                                                  2008│
└─────────────────────────────────────────────────────┘
```

*FIG. 20*

MODULAR INSPECTION SYSTEM FOR MEASURING AN OBJECT

BACKGROUND

The subject matter disclosed herein relates to a modular inspection system for measuring an object.

Triangulation scanners generally include at least one projector and at least one camera, the projector and camera separated by a baseline distance. Such scanners use a triangulation calculation to determine 3D coordinates of points on an object based at least in part on the projected pattern of light and the captured camera image. One category of triangulation scanner, referred to herein as a single-shot scanner, obtains 3D coordinates of the object points based on a single projected pattern of light. Another category of triangulation scanner, referred to herein as a sequential scanner, obtains 3D coordinates of the object points based on a sequence of projected patterns from a stationary projector onto the object.

In the case of a single-shot triangulation scanner, the triangulation calculation is based at least in part on a determined correspondence among elements in each of two patterns. The two patterns may include a pattern projected by the projector and a pattern captured by the camera. Alternatively, the two patterns may include a first pattern captured by a first camera and a second pattern captured by a second camera. In either case, the determination of 3D coordinates by the triangulation calculation provides that a correspondence be determined between pattern elements in each of the two patterns. In most cases, the correspondence is obtained by matching pattern elements in the projected or captured pattern. An alternative approach is described in U.S. Pat. No. 9,599,455 ('455) to Heidemann, et al., the contents of which are incorporated by reference herein. In this approach, the correspondence is determined, not by matching pattern elements, but by identifying spots at the intersection of epipolar lines from two cameras and a projector or from two projectors and a camera. In an embodiment, supplementary 2D camera images may further be used to register multiple collected point clouds together in a common frame of reference. For the system described in Patent '455, the three camera and projector elements are arranged in a triangle, which enables the intersection of the epipolar lines.

BRIEF DESCRIPTION

According to one aspect of the invention, a system for measuring an object includes a plurality of frame segments, the frame segments being configured to mechanically couple together to form a frame, the plurality of frame segments comprising a plurality of measurement device link segments, each of the plurality of measurement device link segments comprising a measurement device which together form a plurality of measurement devices having a field of view within or adjacent to the frame, each of the plurality of measurement devices being operable to measure three-dimensional (3D) coordinates for a plurality of points on the object. The system further includes a computing device to receive data from the plurality of measurement devices via a network established by the plurality of measurement device link segments.

According to another aspect of the invention, a method includes: arranging a plurality of frame segments to form a first frame having a first shape, the plurality of frame segments comprising a plurality of measurement device link segments and a plurality of joint link segments, each of the plurality of measurement device link segments comprising a measurement device which together form a plurality of measurement devices having a field of view within or adjacent to the first frame, each of the plurality of measurement devices being operable to measure three-dimensional (3D) coordinates for a plurality of points on an object. The method further includes establishing a network among the plurality of frame segments when the frame segments are arranged in the first shape to transmit data to a computing device. The method further includes receiving, by the computing device, data from the plurality of measurement devices via the network established by the plurality of frame segments when the plurality of frame segments are arranged in the first shape.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 1A, 1B, 1C, 1D, 1E are isometric, partial isometric, partial top, partial front, and second partial top views, respectively, of a triangulation scanner according to an embodiment;

FIG. 2B is a schematic representation of a triangulation scanner having a projector that projects and uncoded pattern of uncoded spots, received by a first camera, and a second camera according to an embodiment;

FIGS. 5A, 5B, 5C, 5D, 5E are schematic diagrams illustrating different types of projectors according to embodiments;

FIG. 13 depicts a cross-sectional view of the measurement device link segments of FIG. 11 according to an;

FIG. 20 is a list of elements in a method for arranging frame segments to form a modular inspection system according to an embodiment.

Figure 1E:
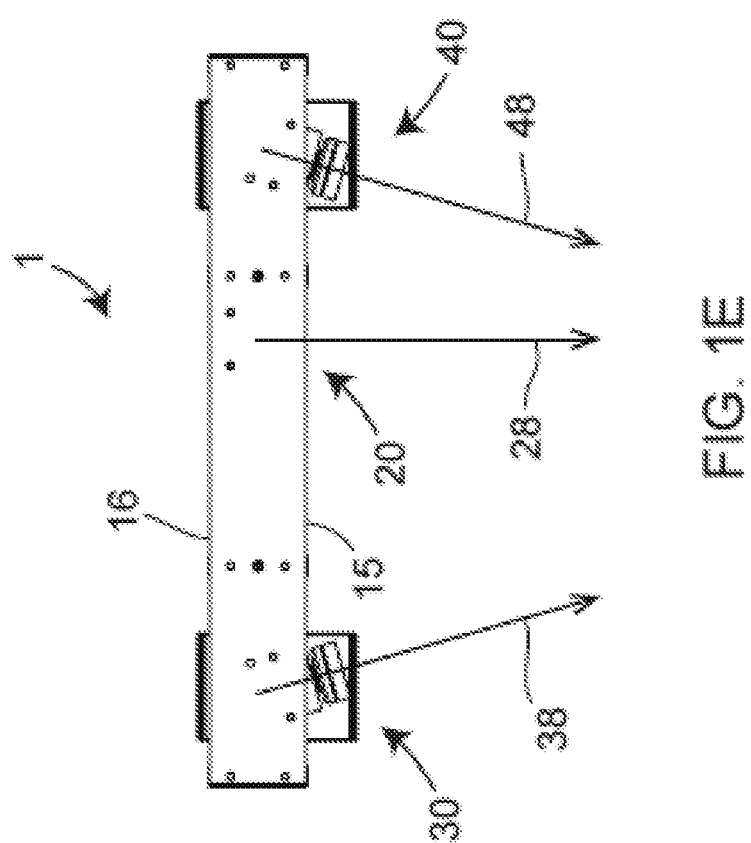

The detailed description explains embodiments of the invention, together with advantages and features, by way of example with reference to the drawings.

DETAILED DESCRIPTION

It may be desired to capture three-dimensional (3D) measurements of objects. However, depending on the size, shape, orientation, etc., of the objects, the mechanical arrangement for different 3D measurement devices (also referred to as scanners or sensors) may need to change. For example, a particular mechanical arrangement of measurement devices for scanning one object may not be suitable for scanning another object.

Embodiments disclosed herein provide advantages in enabling 3D measurements to be obtained of varying objects by using a modular inspection system having multiple measurement devices for measuring and providing a multi-angle scan of such objects. Embodiments further provide for measuring objects that are larger than a field-of-view of a single measurement device. The modular inspection system according to embodiments described herein can be configured and reconfigured in various physical arrangements to accommodate objects of different sizes and shapes. Thus, different measurement devices can be arranged together at different angles to one another, and the modular inspection system has a sensor array outlook depending on the application or object being scanned. A further advantage of embodiments disclosed herein includes creating a network (i.e., a communication network, such as a local area network, wide area network, personal area network, intranet, etc.) among the measurement devices to transmit captured data to a computing device shared among the measurement devices for fast and efficient processing. The network enables large amounts of data to be transferred to the computing device for processing.

In an embodiment illustrated in FIGS. 1A, 1B, 1C, 1D, a triangulation scanner 1 includes a body 5, a projector 20, a first camera 30, and a second camera 40. In an embodiment, the projector optical axis 22 of the projector 20, the first-camera optical axis 32 of the first camera 30, and the second-camera optical axis 42 of the second camera 40 all lie on a common plane 50, as shown in FIGS. 1C, 1D. In some embodiments, an optical axis passes through a center of symmetry of an optical system which might be a projector or a camera, for example. For example, an optical axis may pass through a center of curvature of lens surfaces or mirror surfaces in an optical system. The common plane 50, also referred to as a first plane 50, extends perpendicular into and out of the paper in FIG. 1D.

In an embodiment, the body 5 includes a bottom support structure 6, a top support structure 7, spacers 8, camera mounting plates 9, bottom mounts 10, dress cover 11, windows 12 for the projector and cameras, Ethernet connectors 13, and GPIO connector 14. In addition, the body includes a front side 15 and a back side 16. In an embodiment, the bottom support structure 6 and the top support structure 7 are flat plates made of carbon-fiber composite material. In an embodiment, the carbon-fiber composite material has a low coefficient of thermal expansion (CTE). In an embodiment, the spacers 8 are made of aluminum and are sized to provide a common separation between the bottom support structure 6 and the top support structure 7.

In an embodiment, the projector 20 includes a projector body 24 and a projector front surface 26. In an embodiment, the projector 20 includes a light source 25 that attaches to the projector body 24 that includes a turning mirror and a diffractive optical element (DOE), as explained herein below with respect to FIGS. 5A, 5B, 5C. The light source 25 may be a laser, a superluminescent diode, or a partially coherent LED, for example. In an embodiment, the DOE produces an array of spots arranged in a regular pattern. In an embodiment, the projector 20 emits light at a near infrared wavelength.

In an embodiment, the first camera 30 includes a first-camera body 34 and a first-camera front surface 36. In an embodiment, the first camera includes a lens, a photosensitive array, and camera electronics. The first camera 30 forms on the photosensitive array a first image of the uncoded spots projected onto an object by the projector 20. In an embodiment, the first camera responds to near infrared light.

In an embodiment, the second camera 40 includes a second-camera body 44 and a second-camera front surface 46. In an embodiment, the second camera includes a lens, a photosensitive array, and camera electronics. The second camera 40 forms a second image of the uncoded spots projected onto an object by the projector 20. In an embodiment, the second camera responds to light in the near infrared spectrum. In an embodiment, a processor 2 is used to determine 3D coordinates of points on an object according to methods described herein below. The processor 2 may be included inside the body 5 or may be external to the body. In further embodiments, more than one processor is used. In still further embodiments, the processor 2 may be remotely located from the triangulation scanner.

FIG. 1E is a top view of the triangulation scanner 1. A projector ray 28 extends along the projector optical axis from the body of the projector 24 through the projector front surface 26. In doing so, the projector ray 28 passes through the front side 15. A first-camera ray 38 extends along the first-camera optical axis 32 from the body of the first camera 34 through the first-camera front surface 36. In doing so, the front-camera ray 38 passes through the front side 15. A second-camera ray 48 extends along the second-camera optical axis 42 from the body of the second camera 44 through the second-camera front surface 46. In doing so, the second-camera ray 48 passes through the front side 15.

FIG. 2 shows elements of a triangulation scanner 200 that might, for example, be the triangulation scanner 1 shown in FIGS. 1A, 1B, 1C, 1D, 1E. In an embodiment, the triangulation scanner 200 includes a projector 250, a first camera 210, and a second camera 230. In an embodiment, the projector 250 creates a pattern of light on a pattern generator plane 252. An exemplary corrected point 253 on the pattern projects a ray of light 251 through the perspective center 258 (point D) of the lens 254 onto an object surface 270 at a point 272 (point F). The point 272 is imaged by the first camera 210 by receiving a ray of light from the point 272 through the perspective center 218 (point E) of the lens 214 onto the surface of a photosensitive array 212 of the camera as a corrected point 220. The point 220 is corrected in the read-out data by applying a correction value to remove the effects of lens aberrations. The point 272 is likewise imaged by the second camera 230 by receiving a ray of light from the point 272 through the perspective center 238 (point C) of the lens 234 onto the surface of the photosensitive array 232 of the second camera as a corrected point 235. It should be understood that as used herein any reference to a lens includes any type of lens system whether a single lens or multiple lens elements, including an aperture within the lens system. It should be understood that any reference to a projector in this document refers not only to a system projecting with a lens or lens system an image plane to an object plane. The projector does not necessarily have a physical pattern-generating plane 252 but may have any other set of elements that generate a pattern. For example, in a projector having a DOE, the diverging spots of light may be traced backward to obtain a perspective center for the projector and also to obtain a reference projector plane that appears to generate the pattern. In most cases, the projectors described herein propagate uncoded spots of light in an uncoded pattern. However, a projector may further be operable to project coded spots of light, to project in a coded pattern, or to project coded spots of light in a coded pattern. In other words, in some aspects of the disclosed embodiments, the projector is at least operable to project uncoded spots in an uncoded pattern but may in addition project in other coded elements and coded patterns.

In an embodiment where the triangulation scanner 200 of FIG. 2 is a single-shot scanner that determines 3D coordinates based on a single projection of a projection pattern and a single image captured by each of the two cameras, then a correspondence between the projector point 253, the image point 220, and the image point 235 may be obtained by matching a coded pattern projected by the projector 250 and received by the two cameras 210, 230. Alternatively, the coded pattern may be matched for two of the three elements—for example, the two cameras 210, 230 or for the projector 250 and one of the two cameras 210 or 230. This is possible in a single-shot triangulation scanner because of coding in the projected elements or in the projected pattern or both.

After a correspondence is determined among projected and imaged elements, a triangulation calculation is performed to determine 3D coordinates of the projected element on an object. For FIG. 2, the elements are uncoded spots projected in a uncoded pattern. In an embodiment, a triangulation calculation is performed based on selection of a spot for which correspondence has been obtained on each of two cameras. In this embodiment, the relative position and orientation of the two cameras is used. For example, the baseline distance B3 between the perspective centers 218 and 238 is used to perform a triangulation calculation based on the first image of the first camera 210 and on the second image of the second camera 230. Likewise, the baseline B1 is used to perform a triangulation calculation based on the projected pattern of the projector 250 and on the second image of the second camera 230. Similarly, the baseline B2 is used to perform a triangulation calculation based on the projected pattern of the projector 250 and on the first image of the first camera 210. In an embodiment, the correspondence is determined based at least on an uncoded pattern of uncoded elements projected by the projector, a first image of the uncoded pattern captured by the first camera, and a second image of the uncoded pattern captured by the second camera. In an embodiment, the correspondence is further based at least in part on a position of the projector, the first camera, and the second camera. In a further embodiment, the correspondence is further based at least in part on an orientation of the projector, the first camera, and the second camera.

The term "uncoded element" or "uncoded spot" as used herein refers to a projected or imaged element that includes no internal structure that enables it to be distinguished from other uncoded elements that are projected or imaged. The term "uncoded pattern" as used herein refers to a pattern in which information is not encoded in the relative positions of projected or imaged elements. For example, one method for encoding information into a projected pattern is to project a quasi-random pattern of "dots" in which the relative position of the dots is known ahead of time and can be used to determine correspondence of elements in two images or in a projection and an image. Such a quasi-random pattern contains information that may be used to establish correspondence among points and hence is not an example of a uncoded pattern. An example of an uncoded pattern is a rectilinear pattern of projected pattern elements.

In an embodiment, uncoded spots are projected in an uncoded pattern as illustrated in the scanner system 100 of FIG. 2B. In an embodiment, the scanner system 100 includes a projector 110, a first camera 130, a second camera 140, and a processor 150. The projector projects an uncoded pattern of uncoded spots off a projector reference plane 114. In an embodiment illustrated in FIGS. 2B and 2C, the uncoded pattern of uncoded spots is a rectilinear array 111 of circular spots that form illuminated object spots 121 on the object 120. In an embodiment, the rectilinear array of spots 111 arriving at the object 120 is modified or distorted into the pattern of illuminated object spots 121 according to the characteristics of the object 120. An exemplary uncoded spot 112 from within the projected rectilinear array 111 is projected onto the object 120 as a spot 122. The direction from the projector spot 112 to the illuminated object spot 122 may be found by drawing a straight line 124 from the projector spot 112 on the reference plane 114 through the projector perspective center 116. The location of the projector perspective center 116 is determined by the characteristics of the projector optical system.

In an embodiment, the illuminated object spot 122 produces a first image spot 134 on the first image plane 136 of the first camera 130. The direction from the first image spot to the illuminated object spot 122 may be found by drawing a straight line 126 from the first image spot 134 through the first camera perspective center 132. The location of the first camera perspective center 132 is determined by the characteristics of the first camera optical system.

In an embodiment, the illuminated object spot 122 produces a second image spot 144 on the second image plane 146 of the second camera 140. The direction from the second image spot 144 to the illuminated object spot 122 may be found by drawing a straight line 126 from the second image spot 144 through the second camera perspective center 142. The location of the second camera perspective center 142 is determined by the characteristics of the second camera optical system.

In an embodiment, a processor 150 is in communication with the projector 110, the first camera 130, and the second camera 140. Either wired or wireless channels 151 may be used to establish connection among the processor 150, the projector 110, the first camera 130, and the second camera 140. The processor may include a single processing unit or multiple processing units and may include components such as microprocessors, field programmable gate arrays (FPGAs), digital signal processors (DSPs), and other electrical components. The processor may be local to a scanner system that includes the projector, first camera, and second camera, or it may be distributed and may include networked processors. The term processor encompasses any type of computational electronics and may include memory storage elements.

Figure 2A:
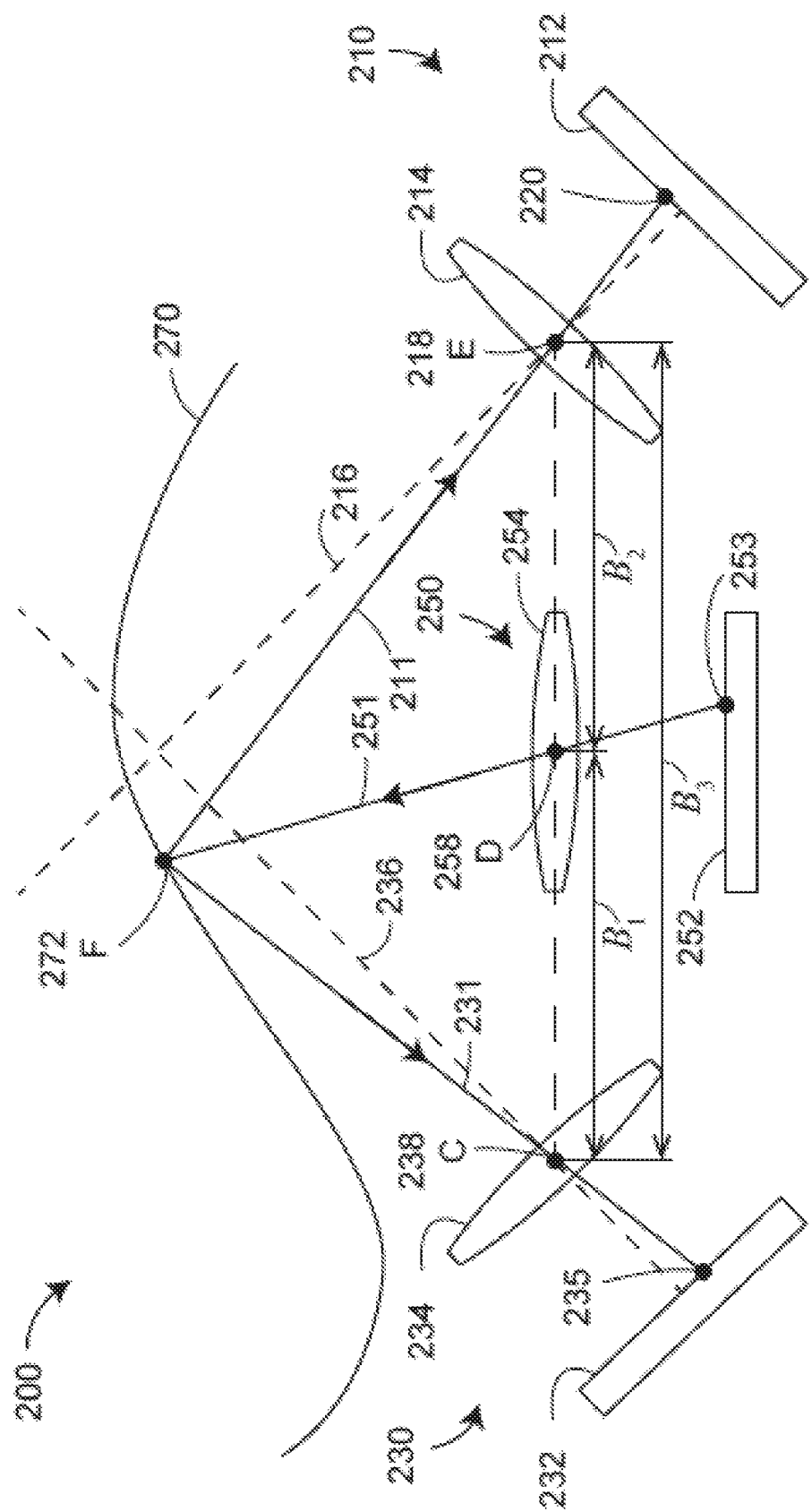
FIG. 2A is a schematic view of a triangulation scanner having a projector, a first camera, and a second camera according to an embodiment.
Figure 2C:
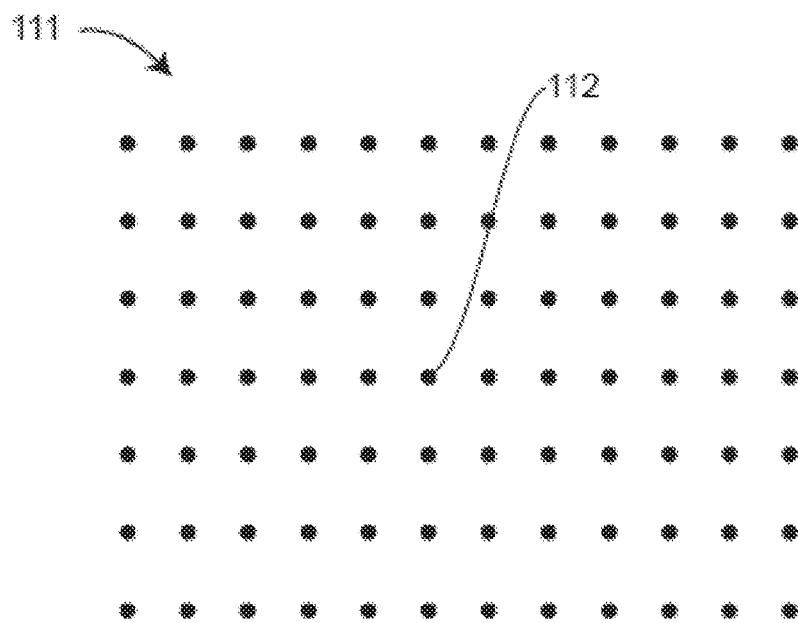
FIG. 2C is an example of an uncoded pattern of uncoded spots according to an embodiment.
Figure 2D:
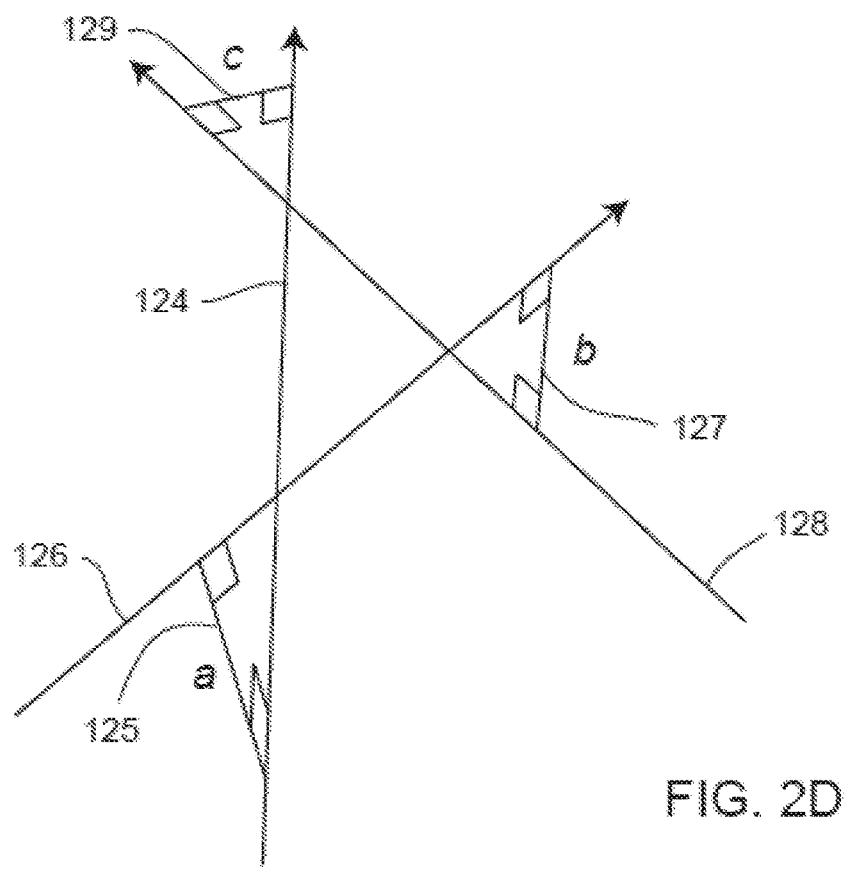
FIG. 2D is a representation of one mathematical method that might be used to determine a nearness of intersection of three lines according to an embodiment.
Figure 2E:
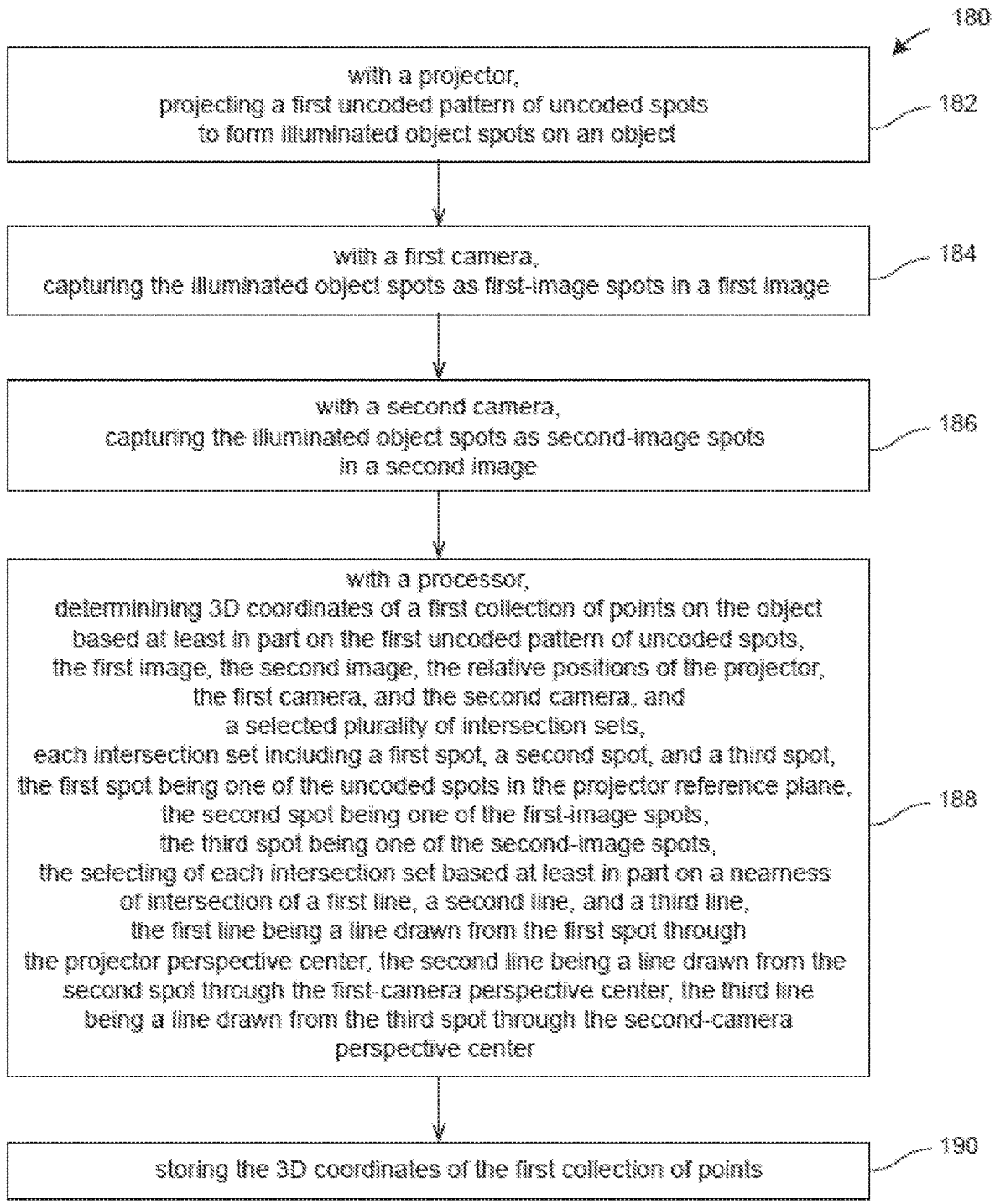
FIG. 2E is a list of elements in a method for determining 3D coordinates of an object according to an embodiment.

FIG. 2E shows elements of a method 180 for determining 3D coordinates of points on an object. An element 182 includes projecting, with a projector, a first uncoded pattern of uncoded spots to form illuminated object spots on an object. FIGS. 2B, 2C illustrate this element 182 using an embodiment 100 in which a projector 110 projects a first uncoded pattern of uncoded spots 111 to form illuminated object spots 121 on an object 120.

A method element 184 includes capturing with a first camera the illuminated object spots as first-image spots in a first image. This element is illustrated in FIG. 2B using an embodiment in which a first camera 130 captures illuminated object spots 121, including the first-image spot 134, which is an image of the illuminated object spot 122. A method element 186 includes capturing with a second camera the illuminated object spots as second-image spots in a second image. This element is illustrated in FIG. 2B using an embodiment in which a second camera 140 captures illuminated object spots 121, including the second-image spot 144, which is an image of the illuminated object spot 122.

A first aspect of method element 188 includes determining with a processor 3D coordinates of a first collection of points on the object based at least in part on the first uncoded pattern of uncoded spots, the first image, the second image, the relative positions of the projector, the first camera, and the second camera, and a selected plurality of intersection sets. This aspect of the element 188 is illustrated in FIGS. 2B, 2C using an embodiment in which the processor 150 determines the 3D coordinates of a first collection of points corresponding to object spots 121 on the object 120 based at least in the first uncoded pattern of uncoded spots 111, the first image 136, the second image 146, the relative positions of the projector 110, the first camera 130, and the second camera 140, and a selected plurality of intersection sets. An example from FIG. 2B of an intersection set is the set that includes the points 112, 134, and 144. Any two of these three points may be used to perform a triangulation calculation to obtain 3D coordinates of the illuminated object spot 122 as discussed herein above in reference to FIGS. 2A, 2B.

A second aspect of the method element 188 includes selecting with the processor a plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on the nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center. This aspect of the element 188 is illustrated in FIG. 2B using an embodiment in which one intersection set includes the first spot 112, the second spot 134, and the third spot 144. In this embodiment, the first line is the line 124, the second line is the line 126, and the third line is the line 128. The first line 124 is drawn from the uncoded spot 112 in the projector reference plane 114 through the projector perspective center 116. The second line 126 is drawn from the first-image spot 134 through the first-camera perspective center 132. The third line 128 is drawn from the second-image spot 144 through the second-camera perspective center 142. The processor 150 selects intersection sets based at least in part on the nearness of intersection of the first line 124, the second line 126, and the third line 128.

The processor 150 may determine the nearness of intersection of the first line, the second line, and the third line based on any of a variety of criteria. For example, in an embodiment, the criterion for the nearness of intersection is based on a distance between a first 3D point and a second 3D point. In an embodiment, the first 3D point is found by performing a triangulation calculation using the first image point 134 and the second image point 144, with the baseline distance used in the triangulation calculation being the distance between the perspective centers 132 and 142. In the embodiment, the second 3D point is found by performing a triangulation calculation using the first image point 134 and the projector point 112, with the baseline distance used in the triangulation calculation being the distance between the perspective centers 134 and 116. If the three lines 124, 126, and 128 nearly intersect at the object point 122, then the calculation of the distance between the first 3D point and the second 3D point will result in a relatively small distance. On the other hand, a relatively large distance between the first 3D point and the second 3D would indicate that the points 112, 134, and 144 did not all correspond to the object point 122.

As another example, in an embodiment, the criterion for the nearness of the intersection is based on a maximum of closest-approach distances between each of the three pairs of lines. This situation is illustrated in FIG. 2D. A line of closest approach 125 is drawn between the lines 124 and 126. The line 125 is perpendicular to each of the lines 124, 126 and has a nearness-of-intersection length a. A line of closest approach 127 is drawn between the lines 126 and 128. The line 127 is perpendicular to each of the lines 126, 128 and has length b. A line of closest approach 129 is drawn between the lines 124 and 128. The line 129 is perpendicular to each of the lines 124, 128 and has length c. According to the criterion described in the embodiment above, the value to be considered is the maximum of a, b, and c. A relatively small maximum value would indicate that points 112, 134, and 144 have been correctly selected as corresponding to the illuminated object point 122. A relatively large maximum value would indicate that points 112, 134, and 144 were incorrectly selected as corresponding to the illuminated object point 122.

The processor 150 may use many other criteria to establish the nearness of intersection. For example, for the case in which the three lines were coplanar, a circle inscribed in a triangle formed from the intersecting lines would be expected to have a relatively small radius if the three points 112, 134, 144 corresponded to the object point 122. For the case in which the three lines were not coplanar, a sphere having tangent points contacting the three lines would be expected to have a relatively small radius.

It should be noted that the selecting of intersection sets based at least in part on a nearness of intersection of the first line, the second line, and the third line is not used in most other projector-camera methods based on triangulation. For example, for the case in which the projected points are coded points, which is to say, recognizable as corresponding when compared on projection and image planes, there is no need to determine a nearness of intersection of the projected and imaged elements. Likewise, when a sequential method is used, such as the sequential projection of phase-shifted sinusoidal patterns, there is no need to determine the nearness of intersection as the correspondence among projected and imaged points is determined based on a pixel-by-pixel comparison of phase determined based on sequential readings of optical power projected by the projector and received by the camera(s). The method element 190 includes storing 3D coordinates of the first collection of points.

Figure 3:
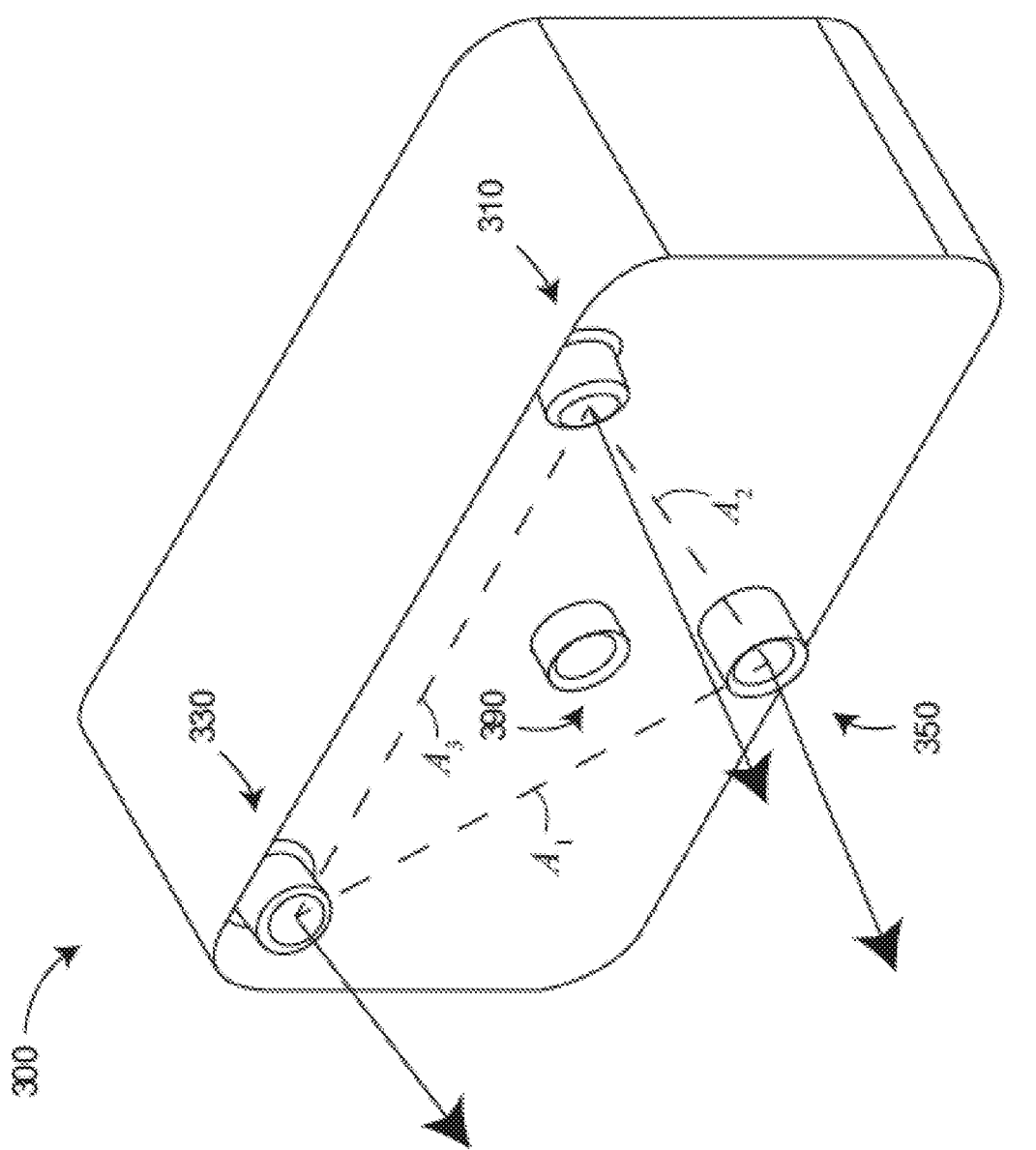
FIG. 3 is an isometric view of a triangulation scanner having a projector and two cameras arranged in a triangle.

An alternative method that uses the intersection of epipolar lines on epipolar planes to establish correspondence among uncoded points projected in an uncoded pattern is described in Patent '455, referenced herein above. In an embodiment of the method described in Patent '455, a triangulation scanner places a projector and two cameras in a triangular pattern. An example of a triangulation scanner 300 having such a triangular pattern is shown in FIG. 3. The triangulation scanner 300 includes a projector 350, a first camera 310, and a second camera 330 arranged in a triangle having sides A1-A2-A3. In an embodiment, the triangulation scanner 300 may further include an additional camera 390 not used for triangulation but to assist in registration and colorization.

Figure 4:
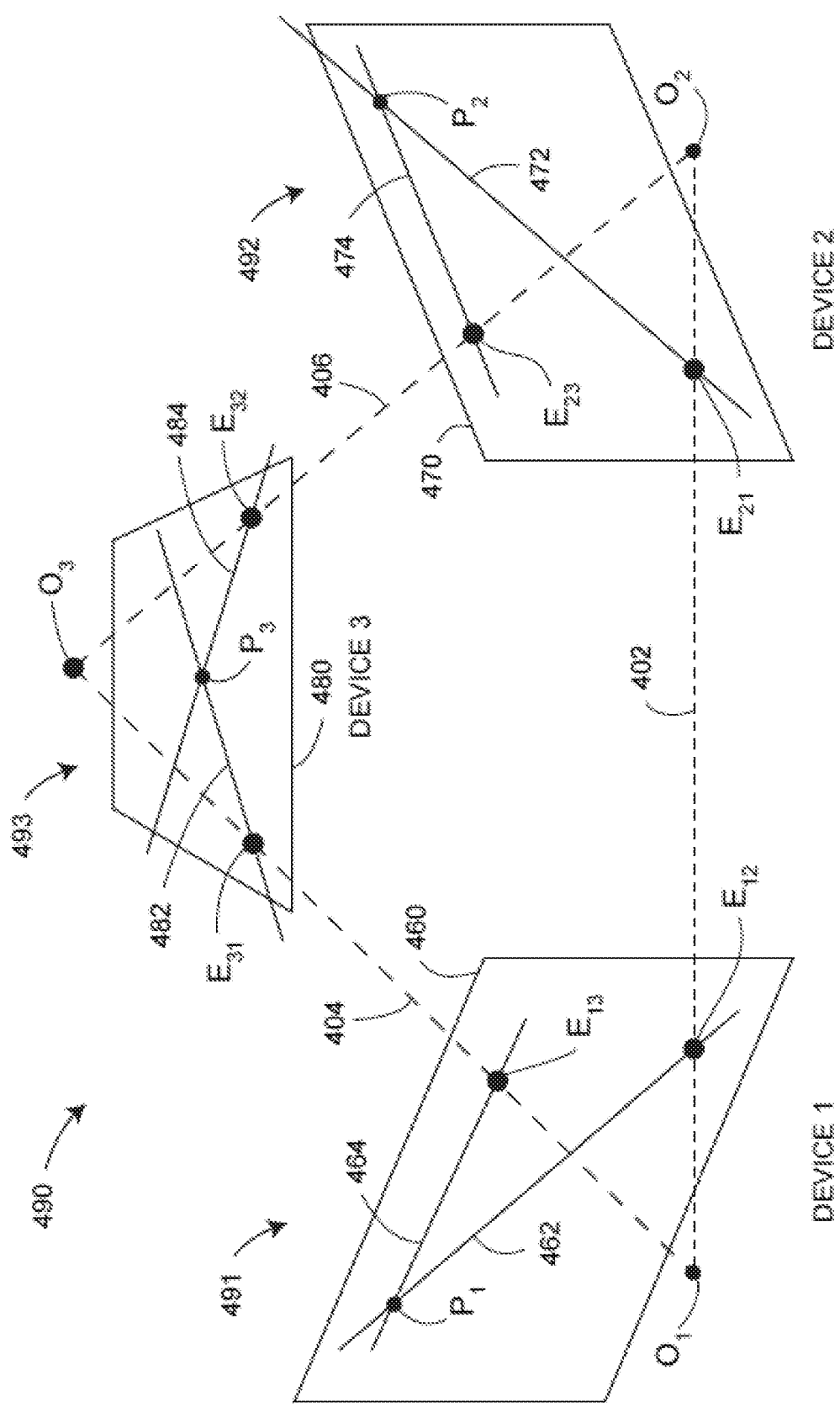
FIG. 4 is a schematic illustration of intersecting epipolar lines in epipolar planes for a combination of projectors and cameras.

Referring now to FIG. 4 the epipolar relationships for a 3D imager (triangulation scanner) 490 correspond with 3D imager 300 of FIG. 3 in which two cameras and one projector are arranged in the shape of a triangle having sides 402, 404, 406. In general, the device 1, device 2, and device 3 may be any combination of cameras and projectors as long as at least one of the devices is a camera. Each of the three devices 491, 492, 493 has a perspective center O1, O2, O3, respectively, and a reference plane 460, 470, and 480, respectively. In FIG. 4, the reference planes 460, 470, 480 are epipolar planes corresponding to physical planes such as an image plane of a photosensitive array or a projector plane of a projector pattern generator surface but with the planes projected to mathematically equivalent positions opposite the perspective centers O1, O2, O3. Each pair of devices has a pair of epipoles, which are points at which lines drawn between perspective centers intersect the epipolar planes. Device 1 and device 2 have epipoles E12, E21 on the planes 460, 470, respectively. Device 1 and device 3 have epipoles E13, E31, respectively on the planes 460, 480, respectively. Device 2 and device 3 have epipoles E23, E32 on the planes 470, 480, respectively. In other words, each reference plane includes two epipoles. The reference plane for device 1 includes epipoles E12 and E13. The reference plane for device 2 includes epipoles E21 and E23. The reference plane for device 3 includes epipoles E31 and E32.

In an embodiment, the device 3 is a projector 493, the device 1 is a first camera 491, and the device 2 is a second camera 492. Suppose that a projection point P3, a first image point P1, and a second image point P2 are obtained in a measurement. These results can be checked for consistency in the following way.

To check the consistency of the image point P1, intersect the plane P3-E31-E13 with the reference plane 460 to obtain the epipolar line 464. Intersect the plane P2-E21-E12 to obtain the epipolar line 462. If the image point P1 has been determined consistently, the observed image point P1 will lie on the intersection of the determined epipolar lines 462 and 464.

To check the consistency of the image point P2, intersect the plane P3-E32-E23 with the reference plane 470 to obtain the epipolar line 474. Intersect the plane P1-E12-E21 to obtain the epipolar line 472. If the image point P2 has been determined consistently, the observed image point P2 will lie on the intersection of the determined epipolar lines 472 and 474.

To check the consistency of the projection point P3, intersect the plane P2-E23-E32 with the reference plane 480 to obtain the epipolar line 484. Intersect the plane P1-E13-E31 to obtain the epipolar line 482. If the projection point P3 has been determined consistently, the projection point P3 will lie on the intersection of the determined epipolar lines 482 and 484.

It should be appreciated that since the geometric configuration of device 1, device 2 and device 3 are known, when the projector 493 emits a point of light onto a point on an object that is imaged by cameras 491, 492, the 3D coordinates of the point in the frame of reference of the 3D imager 490 may be determined using triangulation methods.

Note that the approach described herein above with respect to FIG. 4 may not be used to determine 3D coordinates of a point lying on a plane that includes the optical axes of device 1, device 2, and device 3 since the epipolar lines are degenerate (fall on top of one another) in this case. In other words, in this case, intersection of epipolar lines is no longer obtained. Instead, in an embodiment, determining self-consistency of the positions of an uncoded spot on the projection plane of the projector and the image planes of the first and second cameras is used to determine correspondence among uncoded spots, as described herein above in reference to FIGS. 2B, 2C, 2D, 2E.

FIGS. 5A, 5B, 5C, 5D, 5E are schematic illustrations of alternative embodiments of the projector 20. In FIG. 5A, a projector 500 includes a light source, mirror 504, and diffractive optical element (DOE) 506. The light source 502 may be a laser, a superluminescent diode, or a partially coherent LED, for example. The light source 502 emits a beam of light 510 that reflects off mirror 504 and passes through the DOE. In an embodiment, the DOE 506 produces an array of diverging and uniformly distributed light spots 512. In FIG. 5B, a projector 520 includes the light source 502, mirror 504, and DOE 506 as in FIG. 5A. However, in system 520 of FIG. 5B, the mirror 504 is attached to an actuator 522 that causes rotation 524 or some other motion (such as translation) in the mirror. In response to the rotation 524, the reflected beam off the mirror 504 is redirected or steered to a new position before reaching the DOE 506 and producing the collection of light spots 512. In system 530 of FIG. 5C, the actuator is applied to a mirror 532 that redirects the beam 512 into a beam 536. Other types of steering mechanisms such as those that employ mechanical, optical, or electro-optical mechanisms may alternatively be employed in the systems of FIGS. 5A, 5B, 5C. In other embodiments, the light passes first through the pattern generating element 506 and then through the mirror 504 or is directed towards the object space without a mirror 504.

In the system 540 of FIG. 5D, an electrical signal is provided by the electronics 544 to drive a projector pattern generator 542, which may be a pixel display such as a Liquid Crystal on Silicon (LCoS) display to serve as a pattern generator unit, for example. The light 545 from the LCoS display 542 is directed through the perspective center 547 from which it emerges as a diverging collection of uncoded spots 548. In system 550 of FIG. 5E, a source is light 552 may emit light that may be sent through or reflected off of a pattern generating unit 554. In an embodiment, the source of light 552 sends light to a digital micromirror device (DMD), which reflects the light 555 through a lens 556. In an embodiment, the light is directed through a perspective center 557 from which it emerges as a diverging collection of uncoded spots 558 in an uncoded pattern. In another embodiment, the source of light 562 passes through a slide 554 having an uncoded pattern of dots before passing through a lens 556 and proceeding as an uncoded pattern of light 558. In another embodiment, the light from the light source 552 passes through a lenslet array 554 before being redirected into the pattern 558. In this case, inclusion of the lens 556 is optional.

The actuators 522, 534, also referred to as beam steering mechanisms, may be any of several types such as a piezo actuator, a microelectromechanical system (MEMS) device, a magnetic coil, or a solid-state deflector.

Figure 6B:
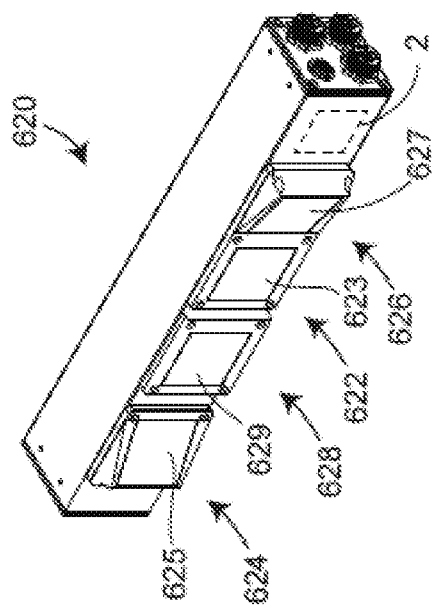
FIG. 6B is an isometric view of a triangulation scanner having three cameras and one projector according to an embodiment.
Figure 6A:
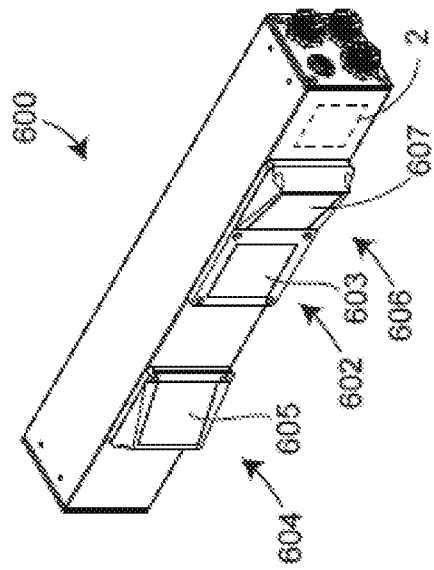
FIG. 6A is an isometric view of a triangulation scanner having two projectors and one camera according to an embodiment.

FIG. 6A is an isometric view of a triangulation scanner 600 that includes a single camera 602 and two projectors 604, 606, these having windows 603, 605, 607, respectively. In the system 600, the projected uncoded spots by the projectors 604, 606 are distinguished by the camera 602. This may be the result of a difference in a characteristic in the uncoded projected spots. For example, the spots projected by the projector 604 may be a different color than the spots projected by the projector 606 if the camera 602 is a color camera. In another embodiment, the triangulation scanner 600 and the object under test are stationary during a measurement, which enables images projected by the projectors 604, 606 to be collected sequentially by the camera 602. The methods of determining correspondence among uncoded spots and afterwards in determining 3D coordinates are the same as those described earlier in FIG. 2 for the case of two cameras and one projector. In an embodiment, the system 600 includes a processor 2 that carries out computational tasks such as determining correspondence among uncoded spots in projected and image planes and in determining 3D coordinates of the projected spots.

FIG. 6B is an isometric view of a triangulation scanner 620 that includes a projector 622 and in addition includes three cameras: a first camera 624, a second camera 626, and a third camera 628. These aforementioned projector and cameras are covered by windows 623, 625, 627, 629, respectively. In the case of a triangulation scanner having three cameras and one projector, it is possible to determine the 3D coordinates of projected spots of uncoded light without knowing in advance the pattern of dots emitted from the projector. In this case, lines can be drawn from an uncoded spot on an object through the perspective center of each of the three cameras. The drawn lines may each intersect with an uncoded spot on each of the three cameras. Triangulation calculations can then be performed to determine the 3D coordinates of points on the object surface. In an embodiment, the system 620 includes the processor 2 that carries out operational methods such as verifying correspondence among uncoded spots in three image planes and in determining 3D coordinates of projected spots on the object.

Figure 6C:
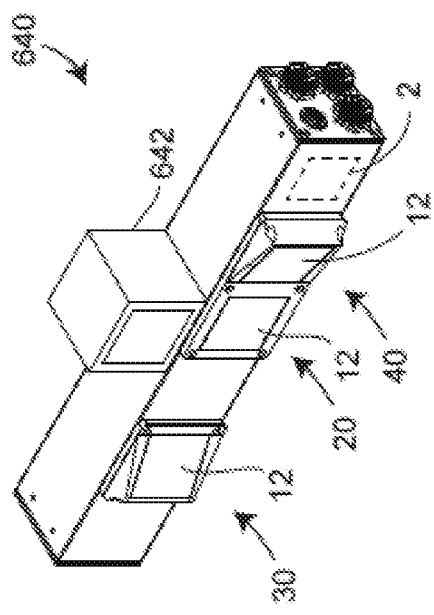
FIG. 6C is an isometric view of a triangulation scanner having one projector and two cameras and further including a camera to assist in registration or colorization according to an embodiment.

FIG. 6C is an isometric view of a triangulation scanner 640 like that of FIG. 1A except that it further includes a camera 642, which is coupled to the triangulation scanner 640. In an embodiment the camera 642 is a color camera that provides colorization to the captured 3D image. In a further embodiment, the camera 642 assists in registration when the camera 642 is moved—for example, when moved by an operator or by a robot.

Figure 7B:
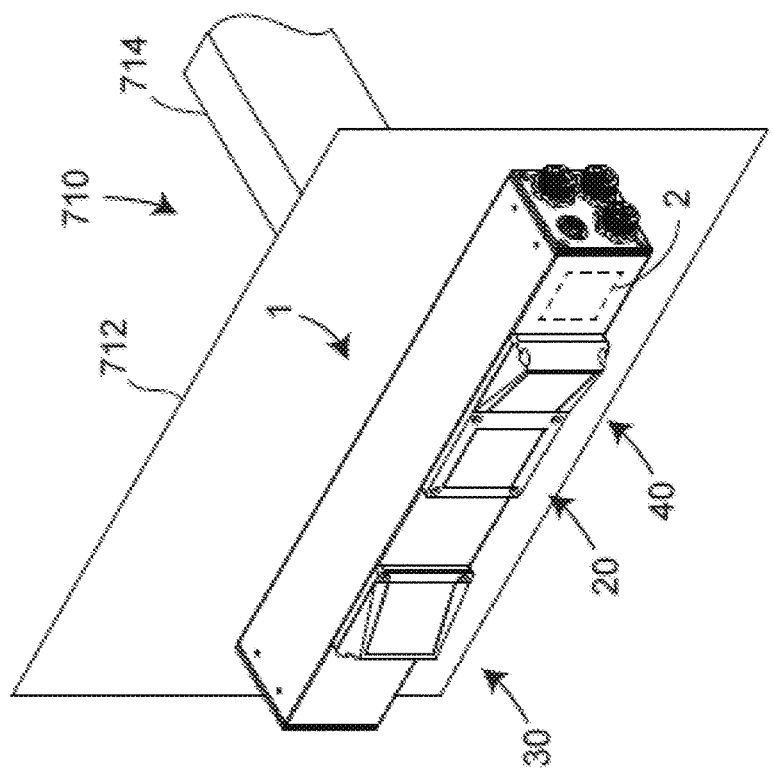
FIG. 7B illustrates a triangulation scanner moved by a robot end effector, according to an embodiment.
Figure 7A:
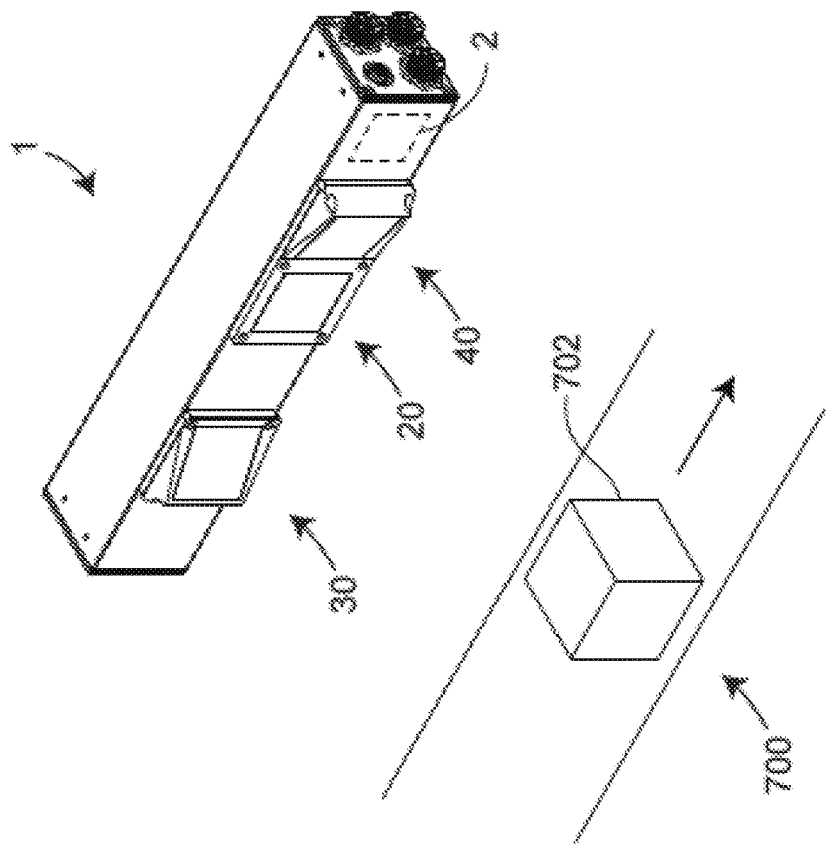
FIG. 7A illustrates a triangulation scanner used to measure an object moving on a conveyor belt according to an embodiment.

FIGS. 7A, 7B illustrate two different embodiments for using the triangulation scanner 1 in an automated environment. FIG. 7A illustrates an embodiment in which a scanner 1 is fixed in position and an object under test 702 is moved, such as on a conveyor belt 700 or other transport device. The scanner 1 obtains 3D coordinates for the object 702. In an embodiment, a processor, either internal or external to the scanner 1, further determines whether the object 702 meets its dimensional specifications. In some embodiments, the scanner 1 is fixed in place, such as in a factory or factory cell for example, and used to monitor activities. In one embodiment, the processor 2 monitors whether there is risk of contact with humans from moving equipment in a factory environment and, in response, issue warnings, alarms, or cause equipment to stop moving.

FIG. 7B illustrates an embodiment in which a triangulation scanner 1 is attached to a robot end effector 710, which may include a mounting plate 712 and robot arm 714. The robot may be moved to measure dimensional characteristics of one or more objects under test. In further embodiments, the robot end effector is replaced by another type of moving structure. For example, the triangulation scanner 1 may be mounted on a moving portion of a machine tool.

Figure 8:
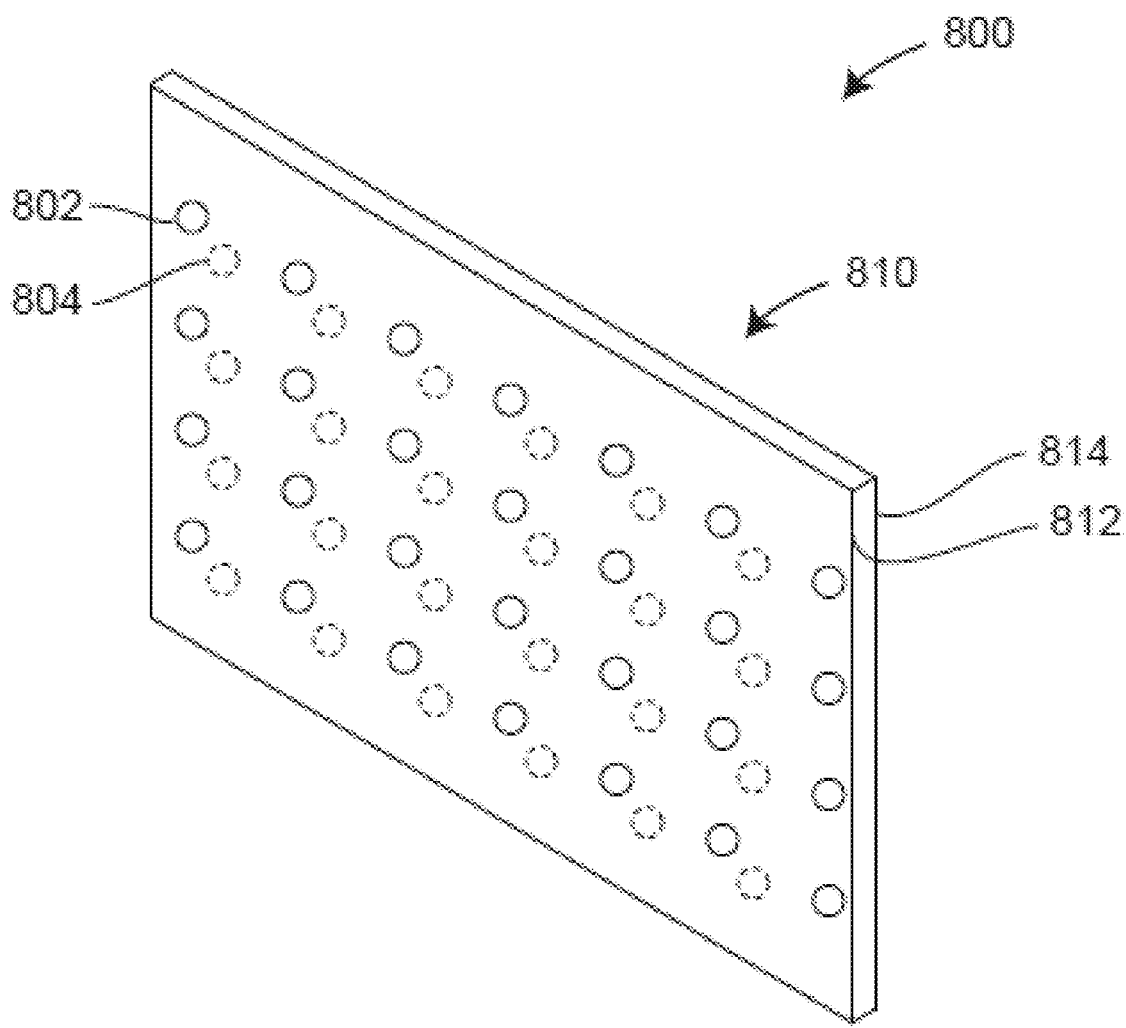
FIG. 8 illustrates front and back reflections off a relatively transparent material such as glass according to an embodiment.

FIG. 8 is a schematic isometric drawing of a measurement application 800 that may be suited to the triangulation scanners described herein above. In an embodiment, a triangulation scanner 1 sends uncoded spots of light onto a sheet of translucent or nearly transparent material 810 such as glass. The uncoded spots of light 802 on the glass front surface 812 arrive at an angle to a normal vector of the glass front surface 812. Part of the optical power in the uncoded spots of light 802 pass through the front surface 812, are reflected off the back surface 814 of the glass, and arrive a second time at the front surface 812 to produce reflected spots of light 804, represented in FIG. 8 as dashed circles. Because the uncoded spots of light 802 arrive at an angle with respect to a normal of the front surface 812, the spots of light 804 are shifted laterally with respect to the spots of light 802. If the reflectance of the glass surfaces is relatively high, multiple reflections between the front and back glass surfaces may be picked up by the triangulation scanner 1.

The uncoded spots of lights 802 at the front surface 812 satisfy the criterion described with respect to FIG. 2 in being intersected by lines drawn through perspective centers of the projector and two cameras of the scanner. For example, consider the case in which in FIG. 2 the element 250 is a projector, the elements 210, 230 are cameras, and the object surface 270 represents the glass front surface 270. In FIG. 2, the projector 250 sends light from a point 253 through the perspective center 258 onto the object 270 at the position 272. Let the point 253 represent the center of a spot of light 802 in FIG. 8. The object point 272 passes through the perspective center 218 of the first camera onto the first image point 220. It also passes through the perspective center 238 of the second camera 230 onto the second image point 235. The image points 200, 235 represent points at the center of the uncoded spots 802. By this method, the correspondence in the projector and two cameras is confirmed for an uncoded spot 802 on the glass front surface 812. However, for the spots of light 804 on the front surface that first reflect off the back surface, there is no projector spot that corresponds to the imaged spots. In other words, in the representation of FIG. 2, there is no condition in which the lines 211, 231, 251 intersect in a single point 272 for the reflected spot 204. Hence, using this method, the spots at the front surface may be distinguished from the spots at the back surface, which is to say that the 3D coordinates of the front surface are determined without contamination by reflections from the back surface. This is possible as long as the thickness of the glass is large enough and the glass is tilted enough relative to normal incidence. Separation of points reflected off front and back glass surfaces is further enhanced by a relatively wide spacing of uncoded spots in the projected uncoded pattern as illustrated in FIG. 8. Although the method of FIG. 8 was described with respect to the scanner 1, the method would work equally well for other scanner embodiments such as the scanners 600, 620, 640 of FIGS. 6A, 6B, 6C, respectively.

Figure 9:
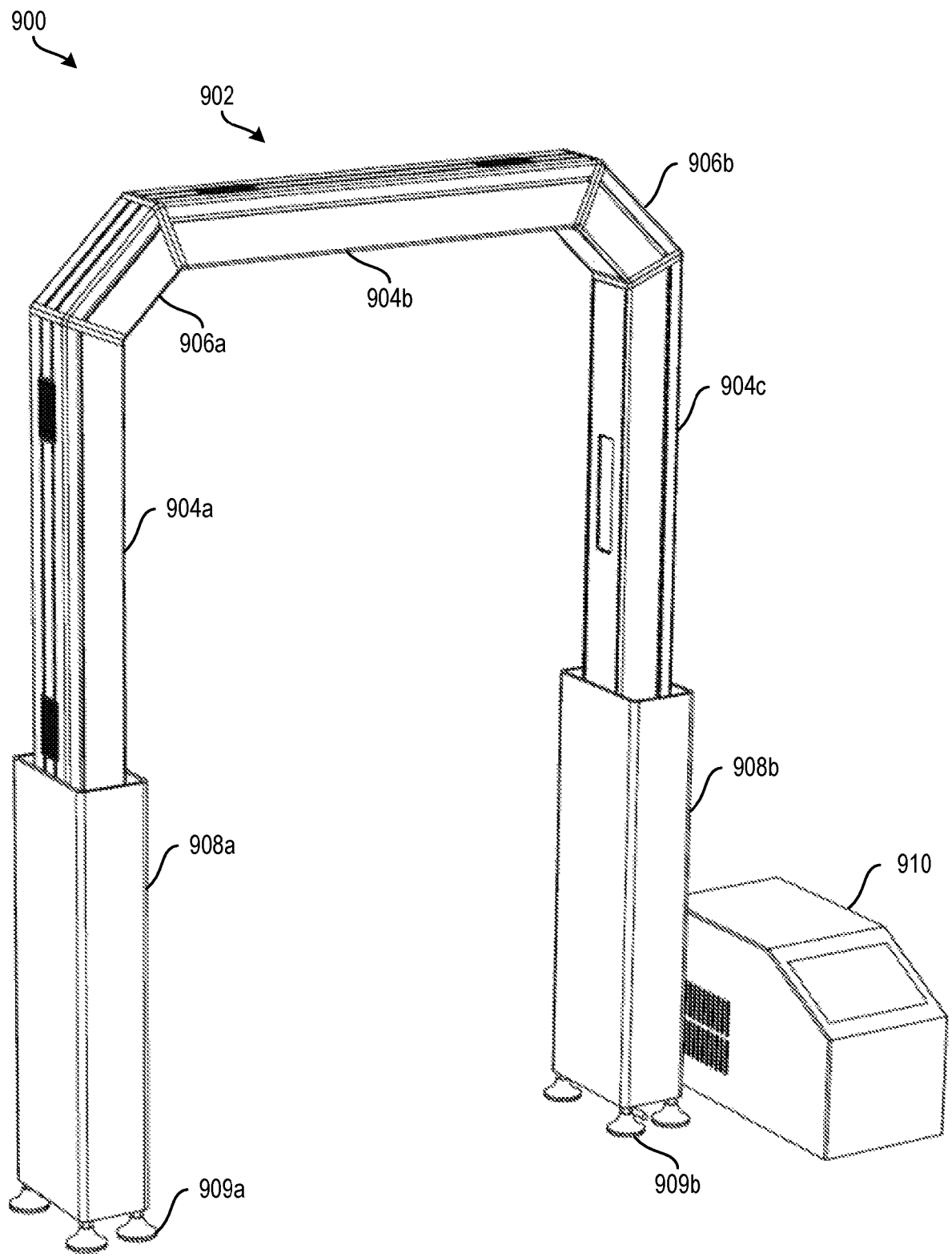
FIG. 9 depicts a modular inspection system according to an embodiment.
Figure 10:
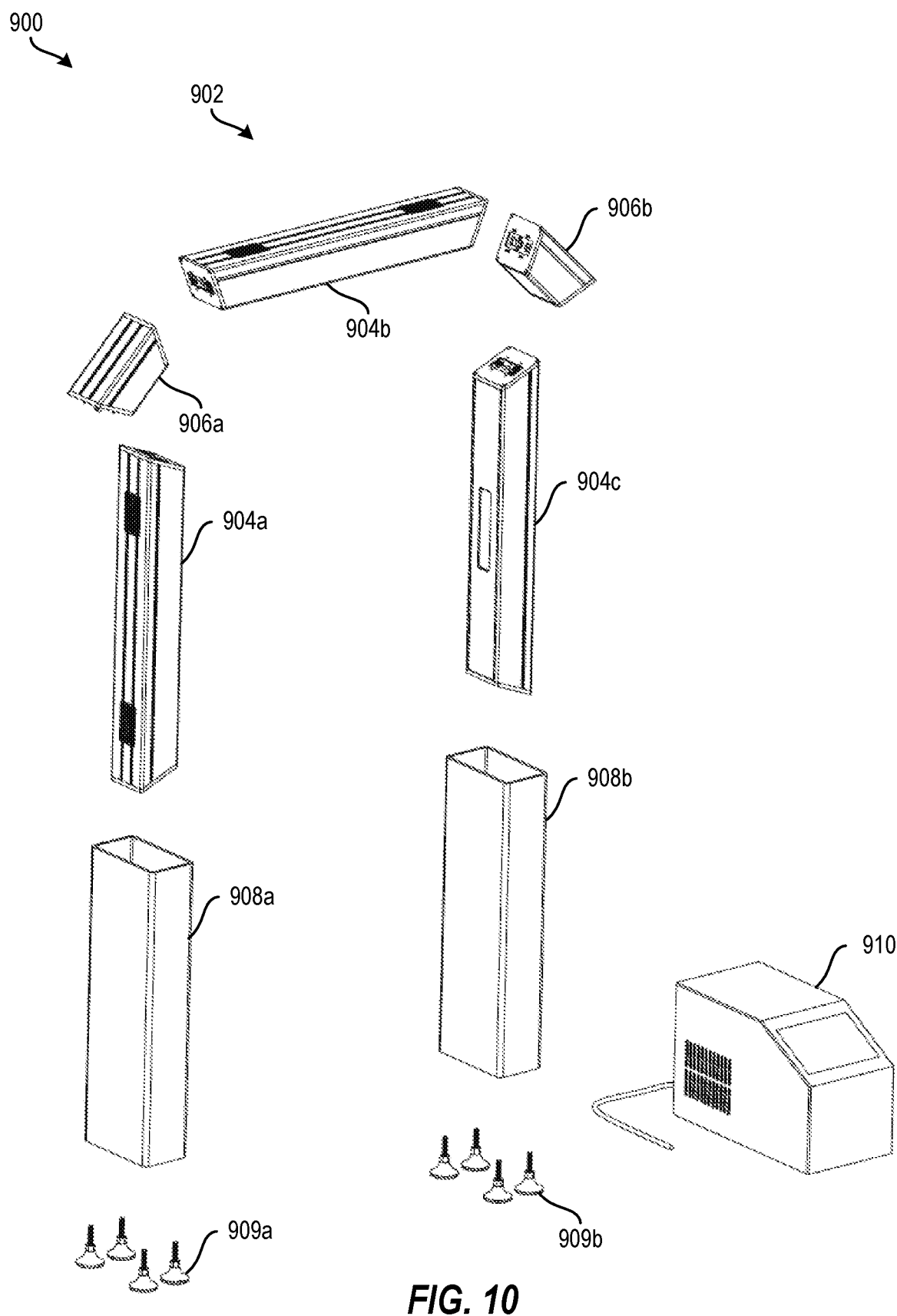
FIG. 10 depicts an unassembled view of the modular inspection system of FIG. 9 according to an embodiment.

FIG. 9 depicts a modular inspection system 900 according to an embodiment. FIG. 10 depicts an exploded view of the modular inspection system 900 of FIG. 9 according to an embodiment. The modular inspection system 900 includes frame segments that mechanically and electrically couple together to form a frame 902.

Figure 11:
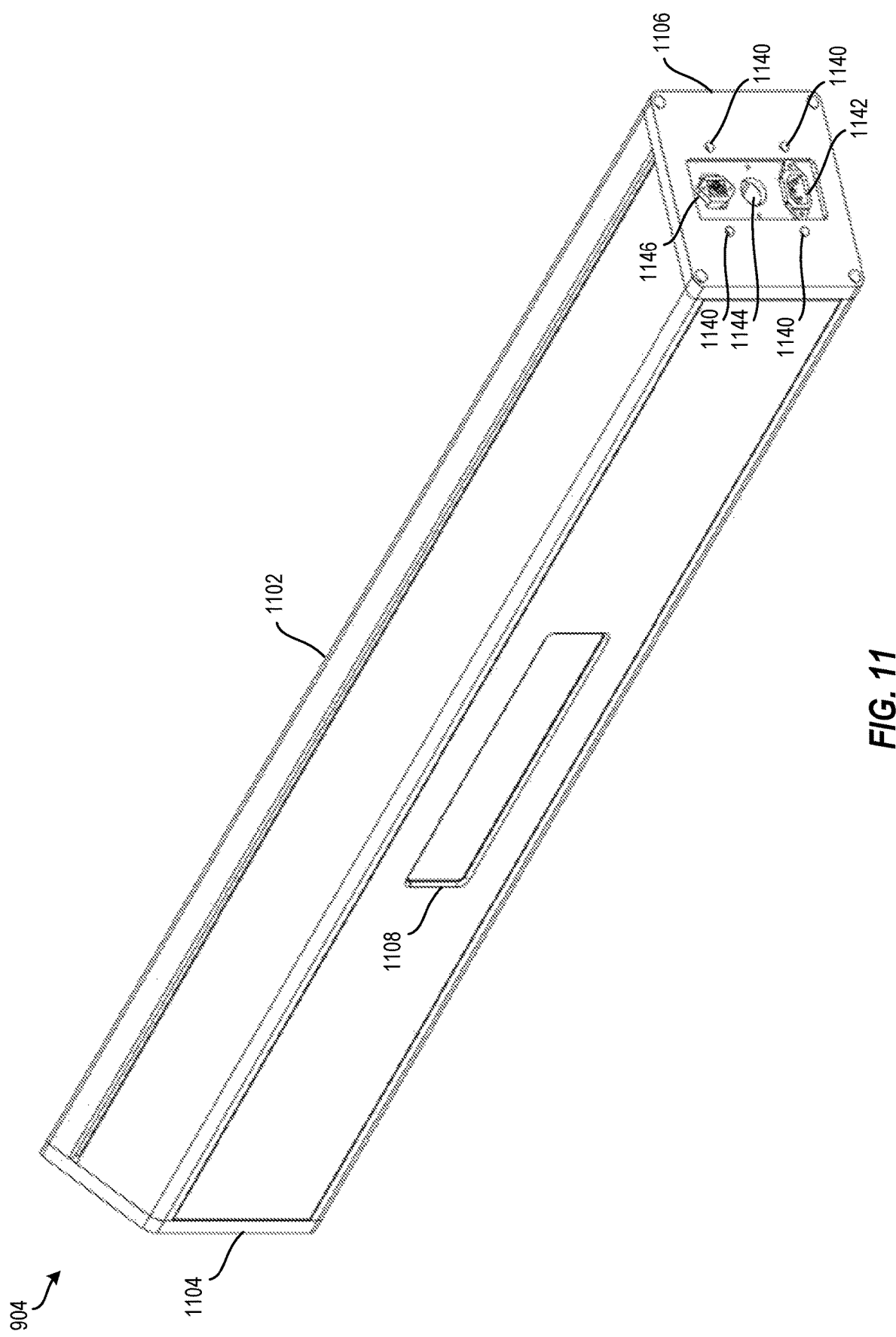
FIG. 11 depicts an isometric view of one of the measurement device link segments of FIG. 9 according to an embodiment.
Figure 12:
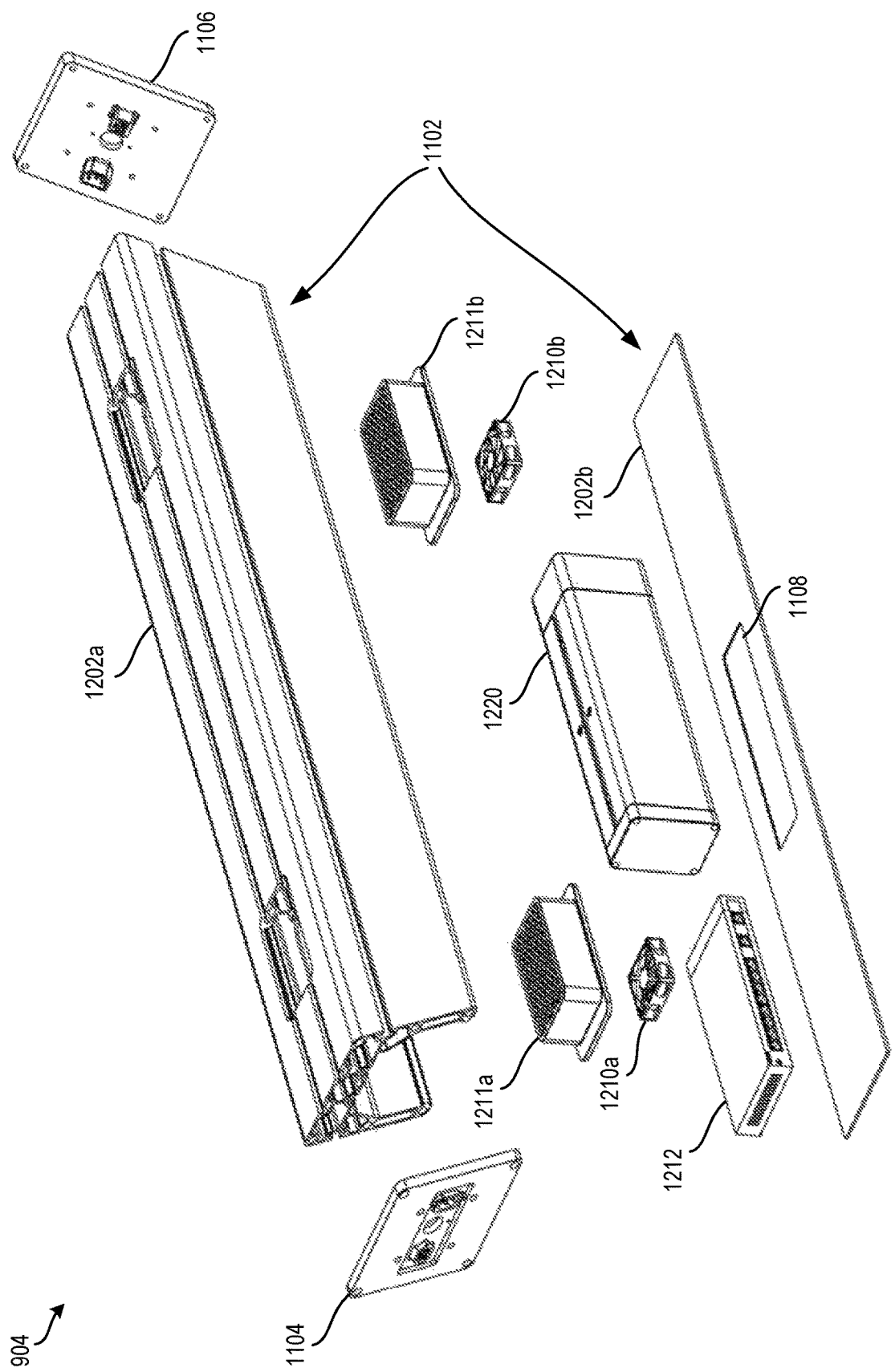
FIG. 12 depicts an unassembled view of the measurement device link segments of FIG. 11 according to an embodiment.
Figure 13:
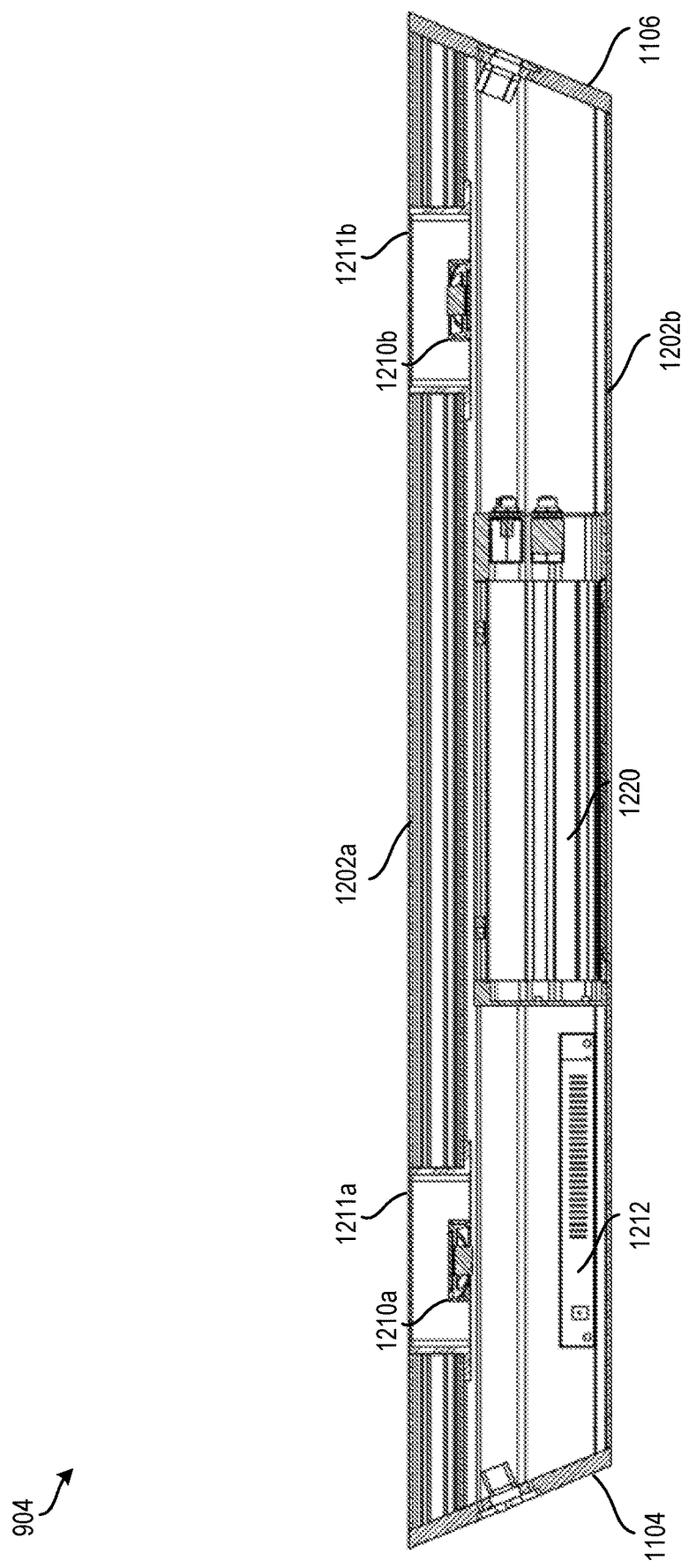

The frame segments can include one or more measurement device link segments 904a, 904b, 904c (collectively referred to as "measurement device link segments 904"). FIGS. 11-13 depict various views of a possible configuration of one of the measurement device link segment 904 of FIG. 9. The frame segments can also include one or more joint link segments 906a, 906b (collectively referred to as "joint link segments 906"). FIGS. 14A, 14B, 14C, 14D, 14E, 14F, 16, 17A, and 17B depict various views of different possible configurations of one of the joint link segments 906 of FIG. 9 according to an embodiment.

The measurement device link segments 904 include one or more measurement devices. Examples of measurement devices are described herein and can include: the triangulation scanner 1 shown in FIGS. 1A, 1B, 1C, 1D, 1E; the triangulation scanner 200 shown in FIG. 2A; the triangulation scanner 300 shown in FIG. 3; the triangulation scanner 600 shown in FIG. 6A; the triangulation scanner 620 shown in FIG. 6B; the triangulation scanner 640 shown in FIG. 6C; or the like.

Measurement devices, such as the triangulation scanners described herein, are often used in the inspection of objects to determine in the object is in conformance with specifications. When objects are large, such as with automobiles for example, these inspections may be difficult and time consuming. To assist in these inspections, sometimes non-contact three-dimensional (3D) coordinate measurement devices are used in the inspection process. An example of such a measurement device is a 3D laser scanner time-of-flight (TOF) coordinate measurement device. A 3D laser scanner of this type steers a beam of light to a non-cooperative target such as a diffusely scattering surface of an object (e.g. the surface of the automobile). A distance meter in the device measures a distance to the object, and angular encoders measure the angles of rotation of two axles in the device. The measured distance and two angles enable a computing device 910 to determine the 3D coordinates of the target.

In the illustrated embodiment of FIG. 9, the measurement devices of the measurement device link segments 904 are triangulation or area scanners, such as that described in commonly owned United States Patent Application 2017/0054965 or United States Patent Application 2018/0321383, the contents of both of which are incorporated herein by reference. In an embodiment, an area scanner emits a pattern of light from a projector onto a surface of an object and acquires a pair of images of the pattern on the surface. In at least some instances, the 3D coordinates of the elements of the pattern are able to be determined. In other embodiments, the area scanner may include two projectors and one camera or other suitable combinations of projector(s) and camera(s).

The measurement device link segments 904 also include electrical components to enable data to be transmitted from the measurement devices of the measurement device link segments 904 to the computing device 910 or another suitable device. Such electrical components are depicted in FIG. 13, for example, and are described in more detail herein. The joint link segments 906 can also include electrical components to enable the data to be transmitted from measurement devices of the measurement device link segments 904 to the computing device 910.

The frame segments, including one or more of the measurement device link segments 904 and/or one or more of the joint link segments 906, can be partially or wholly contained in or connected to one or more base stands 908a, 908b. The base stands 908a, 908b provide support for the frame 902 and can be of various sizes, shapes, dimensions, orientations, etc., to provide support for the frame 902. The base stands 908a, 908b can include or be connected to one or more leveling feet 909a, 909b, which can be adjusted to level the frame 902 or otherwise change the orientation of the frame 902 relative to a surface (not shown) upon which the frame 902 is placed. Although not shown, the base stands 908a, 908b can include one or more measurement devices.

FIG. 11 depicts an isometric view of one of the measurement device link segments 904 of FIG. 9 according to an embodiment. The measurement device link segment 904 includes a body portion 1102 extending between a first end portion 1104 and a second end portion 1106.

The body portion 1102 of the measurement device link segment 904 includes a housing 1108 to house one or more measurement devices. Although one housing 1108 is shown, it should be appreciated that additional housings for housing additional measurement devices can be included in the measurement device link segment 904.

Figure 18:
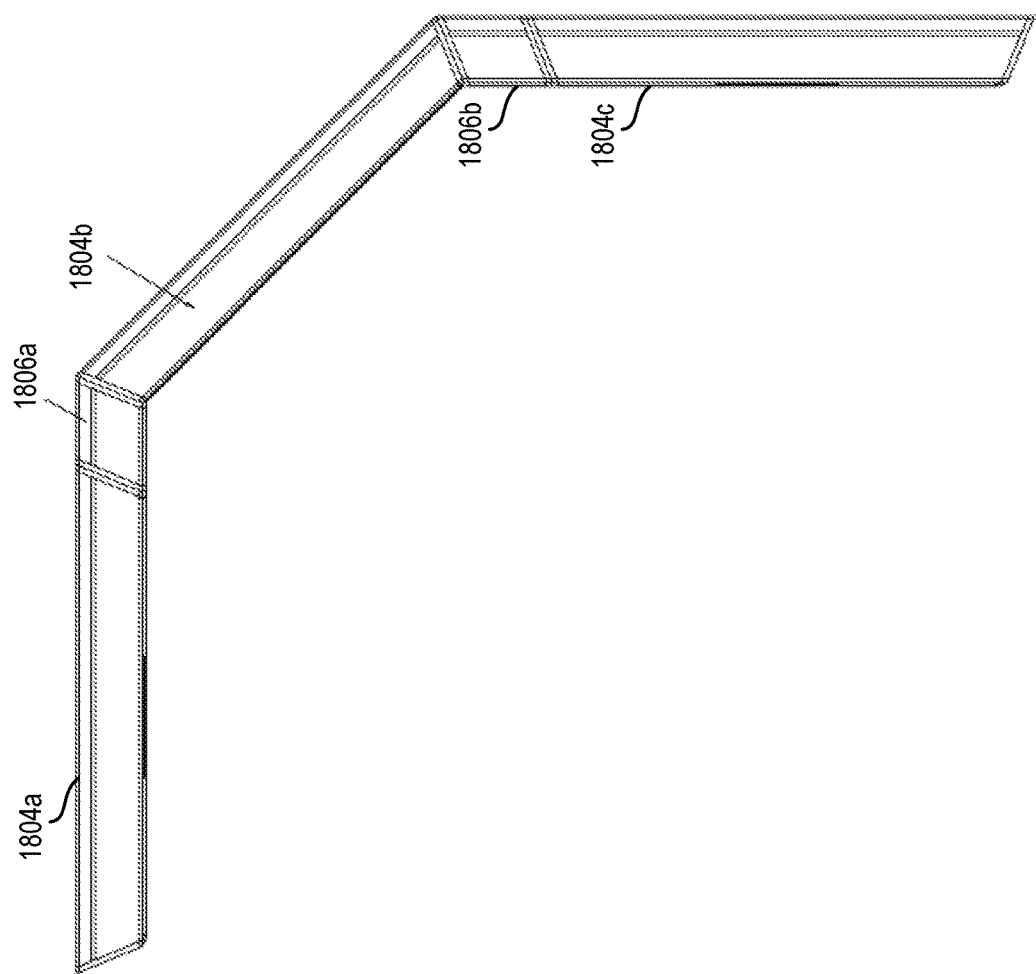
FIG. 18 depicts a portion of a frame of a modular inspection system according to an embodiment.
Figure 19:
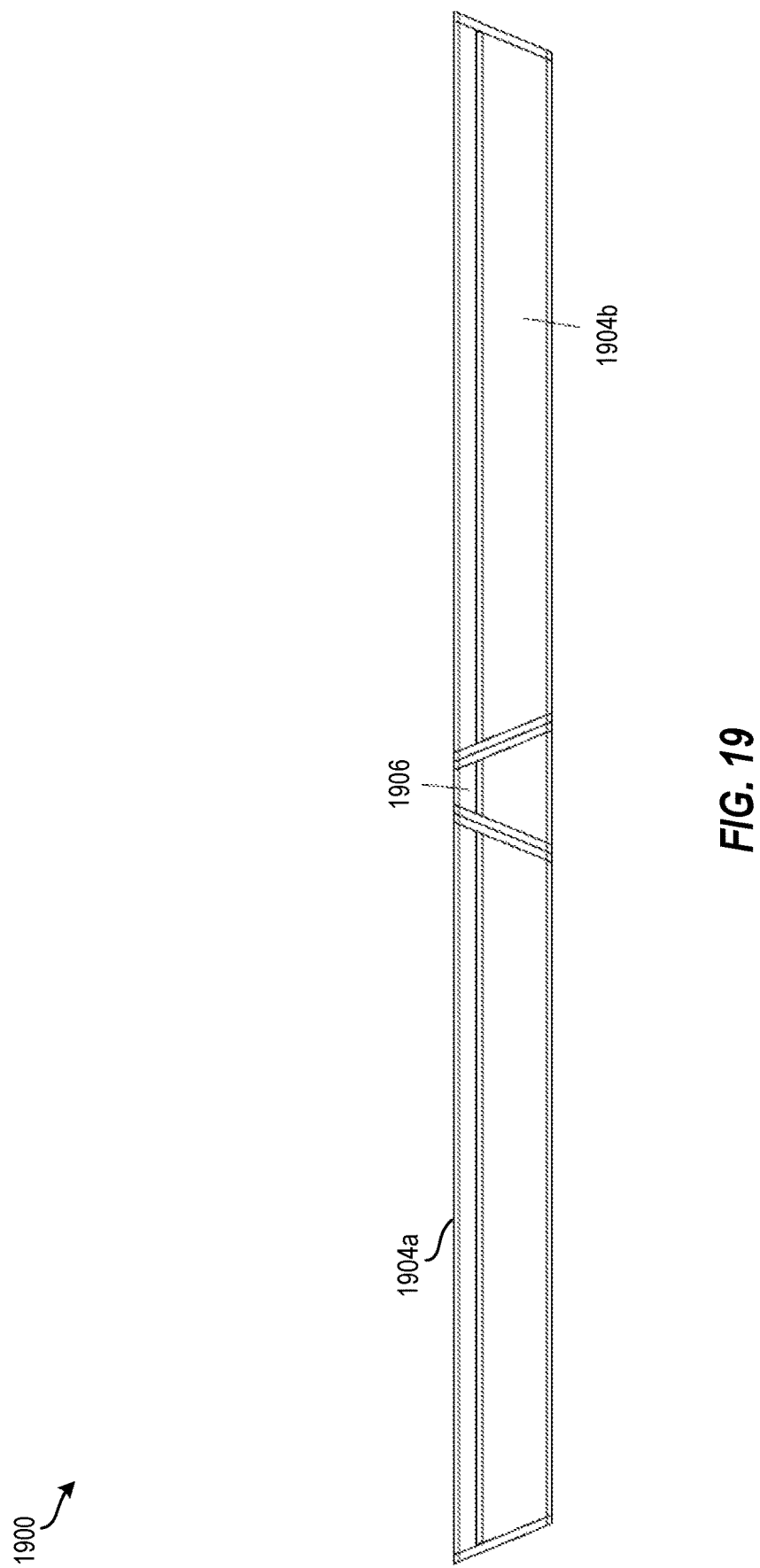
FIG. 19 depicts a portion of a frame of a modular inspection system according to an embodiment.

The first end portion 1104 and the second end portion 1106 include mechanical connectors (couplings) and electrical connectors (couplings) to enable the measurement device link segment 904 to be coupled (mechanically and electrically) to other measurement device link segments and/or to joint link segments. For example, as shown in the embodiment of FIG. 9, the measurement device link segment 904b is coupled to the joint link segment 906a and to the joint link segment 906b. The joint link segments 906a, 906b are also respectively coupled to the measurement device link segments 904a, 904c. Thus, the frame 902 is formed and supported by the base stands 908a, 908b. In examples, other configurations are possible such that the shape of the frame 902 can vary. For example, different numbers and arrangements of measurement device link segments 904 and/or joint link segments 906 can be used. Examples of different arrangements of measurement device link segments 904 and joint link segments are depicted in FIGS. 18 and 19, which are further discussed herein.

According to examples, the first end portion 1104 forms an angle relative to the body portion 1102 of the measurement device link segment 904. Similarly, the second end portion 1106 forms an angle relative to the body portion 1102 of the measurement device link segment 904. The angle can vary in different examples. For example, the angle can be 22.5 degrees, 45 degrees, 90 degrees, 135 degrees, 157.5 degrees, etc. The different angular configurations enable different frame configurations to be created.

The first end portion 1104 can be configured as a "mating end" and the second end portion 1106 can be configured as a "receiving end." Other of the measurement device link segments 904 (and also the joint link segments 906) can be similarly arranged. This enables the first end portion 1104 (mating end) to be coupled to a receiving end of another measurement device link segment 904 or to a receiving end of a joint link segment 906.

Figure 14A:
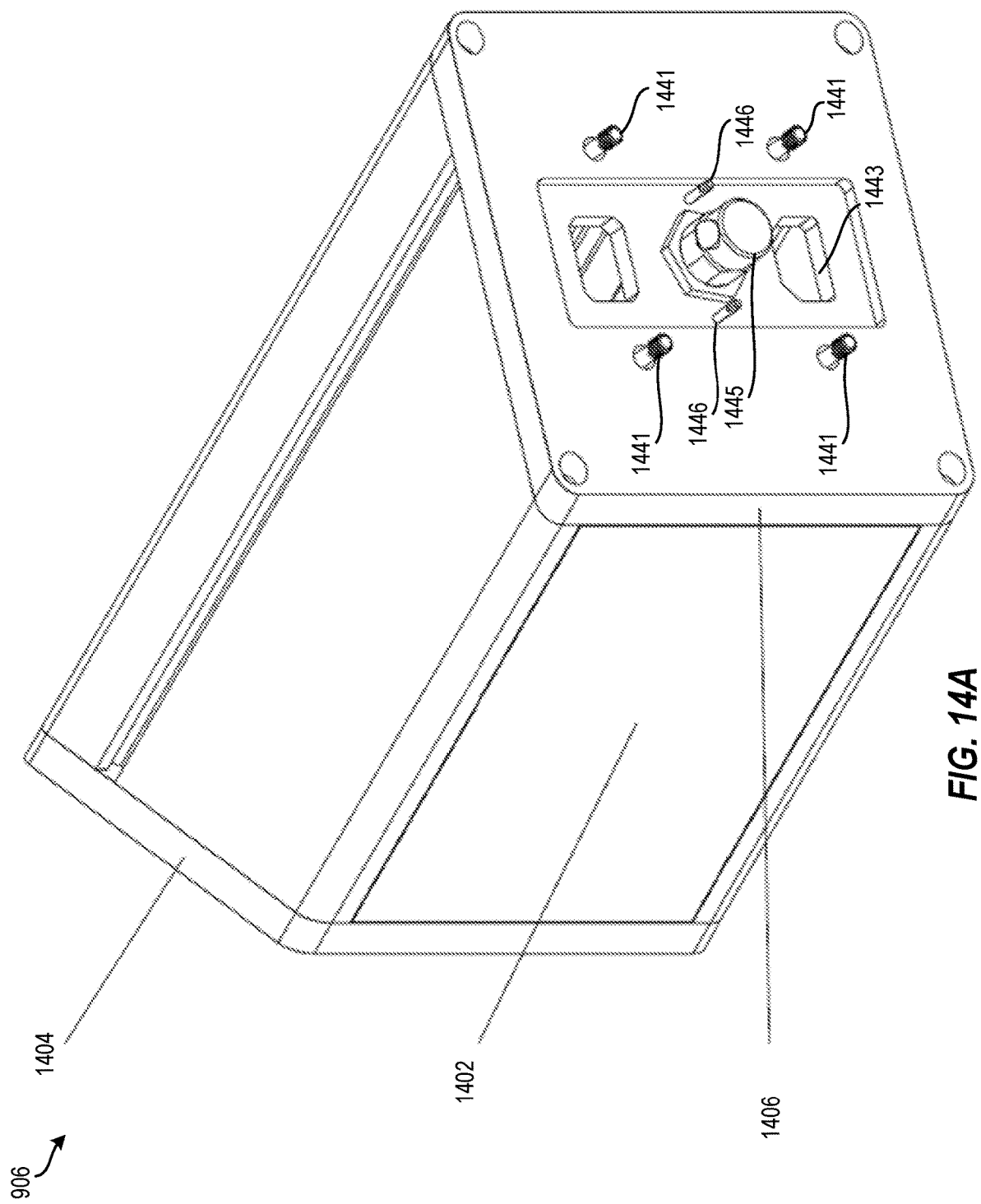
FIG. 14A depicts an isometric view an example joint link segment of one of the joint link segments of FIG. 9 according to an embodiment.

The mechanical connectors can include receivers 1140, which are configured to receive a mating mechanical connector associated with a mating end of another frame segment. FIG. 14A, which depicts an example of the joint link segment 906, includes mating mechanical connectors 1441, which can be received by the receivers 1140 of the measurement device link segment 904. Together, receivers 1140 and the mating mechanical connectors 1441 create a mechanical connector that can be used to mechanically couple the respective measurement device link segment 904 to the joint link segment 906. Although four receivers 1140 and a corresponding four mating mechanical connectors 1441 are depicted, other numbers, configurations, and types of mechanical connectors (or fasteners) can be utilized to mechanically couple frame segments together.

The electrical connectors can include electrical receiver 1144, which is configured to receive a mating electrical connector associated with a mating end of another frame segment. As used herein, electrical connectors can include fiber optical connectors. With reference to FIG. 14A, the joint link segment 906 includes a mating electrical connector 1445. Together, the electrical receiver 1144 and the mating electrical connector 1445 create an electrical connection that can be used to electrically couple the respective measurement device link segment 904 to the joint link segment 906. The electrical connectors enable data, power, etc., to be transmitted by one frame segment to another frame segment. Different types of electrical connectors can include Ethernet connectors, coaxial connectors, optical connectors, and the like. In some examples, as shown in FIG. 11, a second electrical receiver 1146 can be included. In such examples, the electrical receiver 1144 and the second electrical receiver 1146 can be of different types (e.g., the electrical receiver 1144 can be used to form an optical connection and the second electrical receiver 1146 can be used to form an electrical connection (e.g., Ethernet)).

In the example of FIG. 11, the measurement device link segment 904 includes a power connector 1142, which is configured to receive an end of a power cable via a power slot 1443 of FIG. 14A or a power connector on another frame segment. This enables power to be transmitted between frame segments to power electrical components within the frame segments.

FIG. 12 depicts an exploded view of one of the measurement device link segments 904 of FIG. 9 according to an embodiment. FIG. 13 depicts a cross-sectional view of one of the measurement device link segments 904 of FIG. 9 according to an embodiment.

The measurement device link segment 904 includes a body portion 1102 extending between the first end portion 1104 and the second end portion 1106. In this example, the body portion 1102 is a two-piece body portion that includes a first body portion section 1202a and a second body portion section 1202b. The body portion 1102 is configured to house several electrical components including fans 1210a, 1210b (contained in fan housings 1211a, 1211b respectively) for circulating air and dissipating heat, a network switch 1212 for facilitating the transfer of data, and a measurement device 1220 for collecting measurement data about an object. In some examples, a measurement device link segment 904 can include more or fewer of these components (e.g., a measurement device link segment 904 can include two or more network switches).

Although not shown, the electrical receiver 1144 and/or the second electrical receiver 1146 can be electrically coupled to the switch 1212. The measurement device 1220 can also be electrically coupled to the switch 1212. Accordingly, the measurement device 1220 can transmit data to and receive data from other devices (e.g., other measurement devices, the computing device 910, etc.) via the switch 1212. In some examples, multiple electrical connections (such as electrical cables) are connected between the switch 1212 and the measurement device. This enables the measurement device to transmit and receive large volumes of data.

Figure 14B:
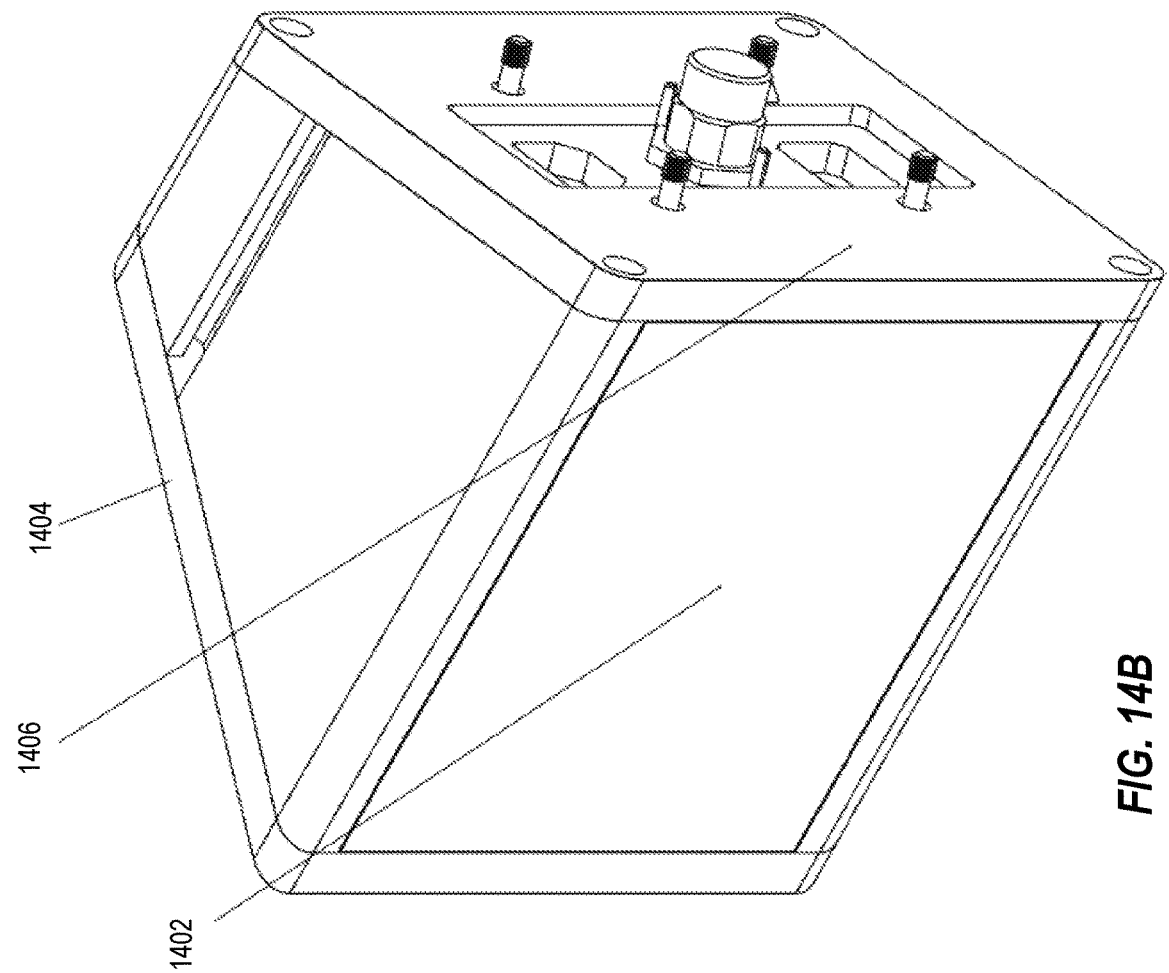
FIG. 14B depicts an isometric view of another example joint link segment according to an embodiment.
Figure 14C:
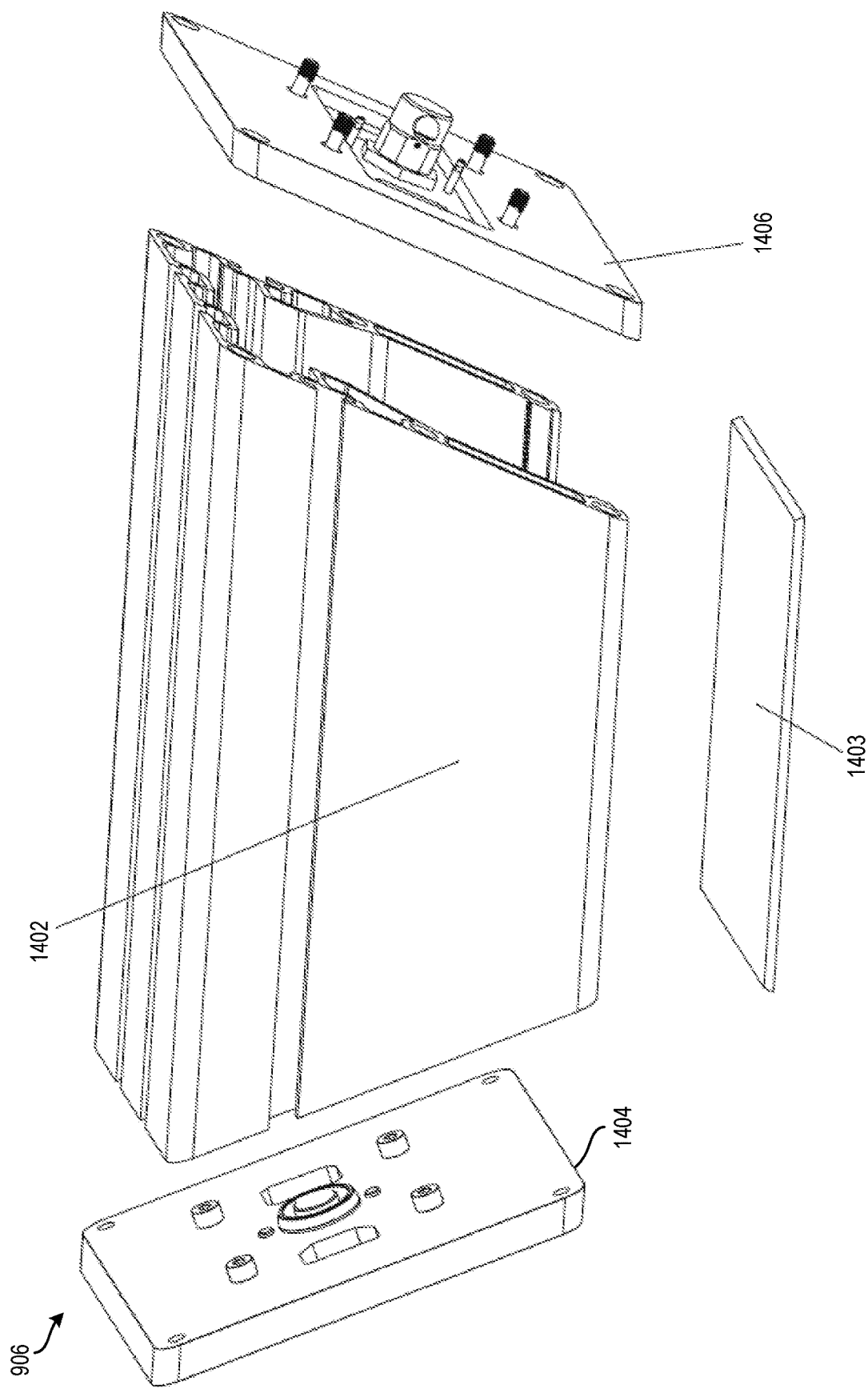
FIG. 14C depicts an exploded view the example joint link segment of FIG. 14A according to an embodiment.
Figure 14D:
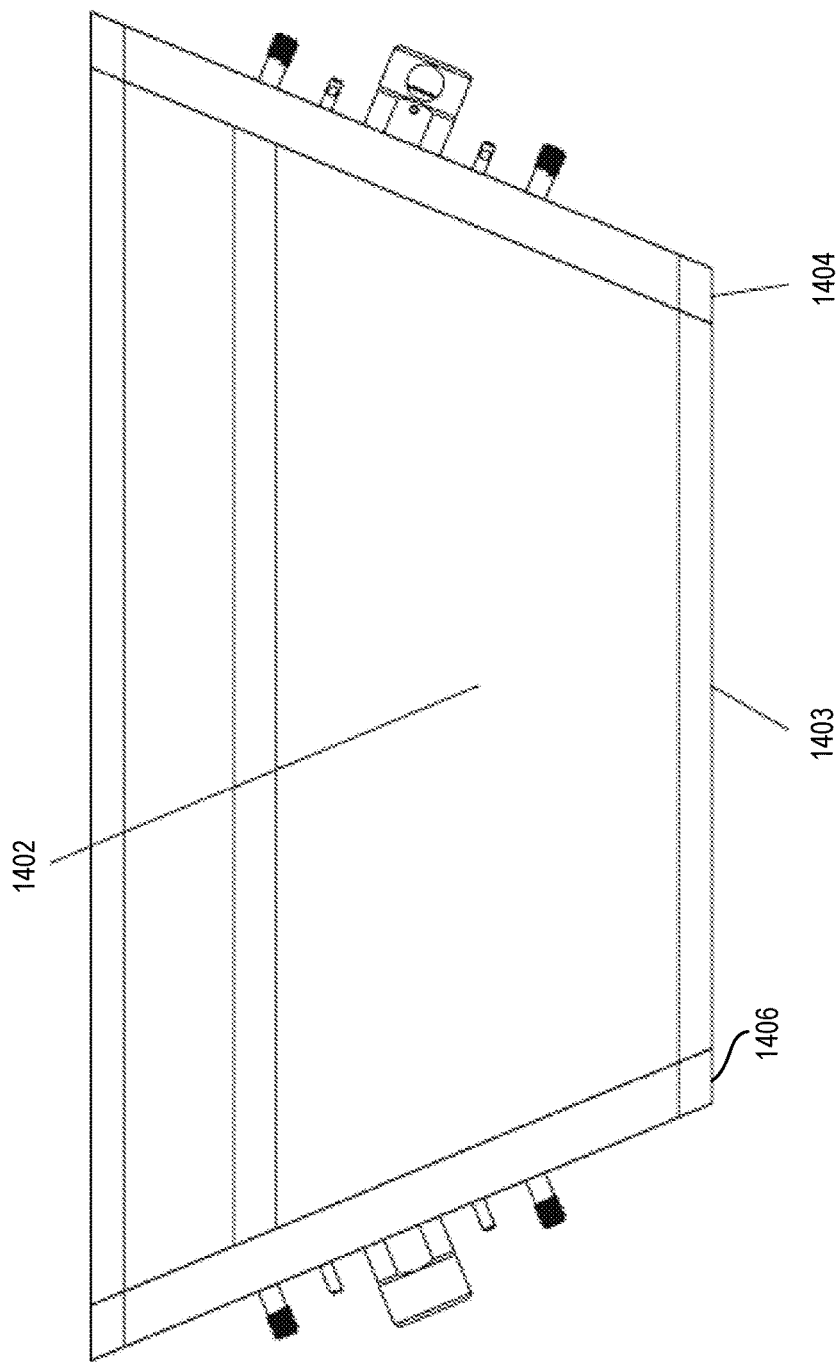
FIG. 14D depicts a side view of the example joint link segment of FIG. 14A according to an embodiment.
Figure 14E:
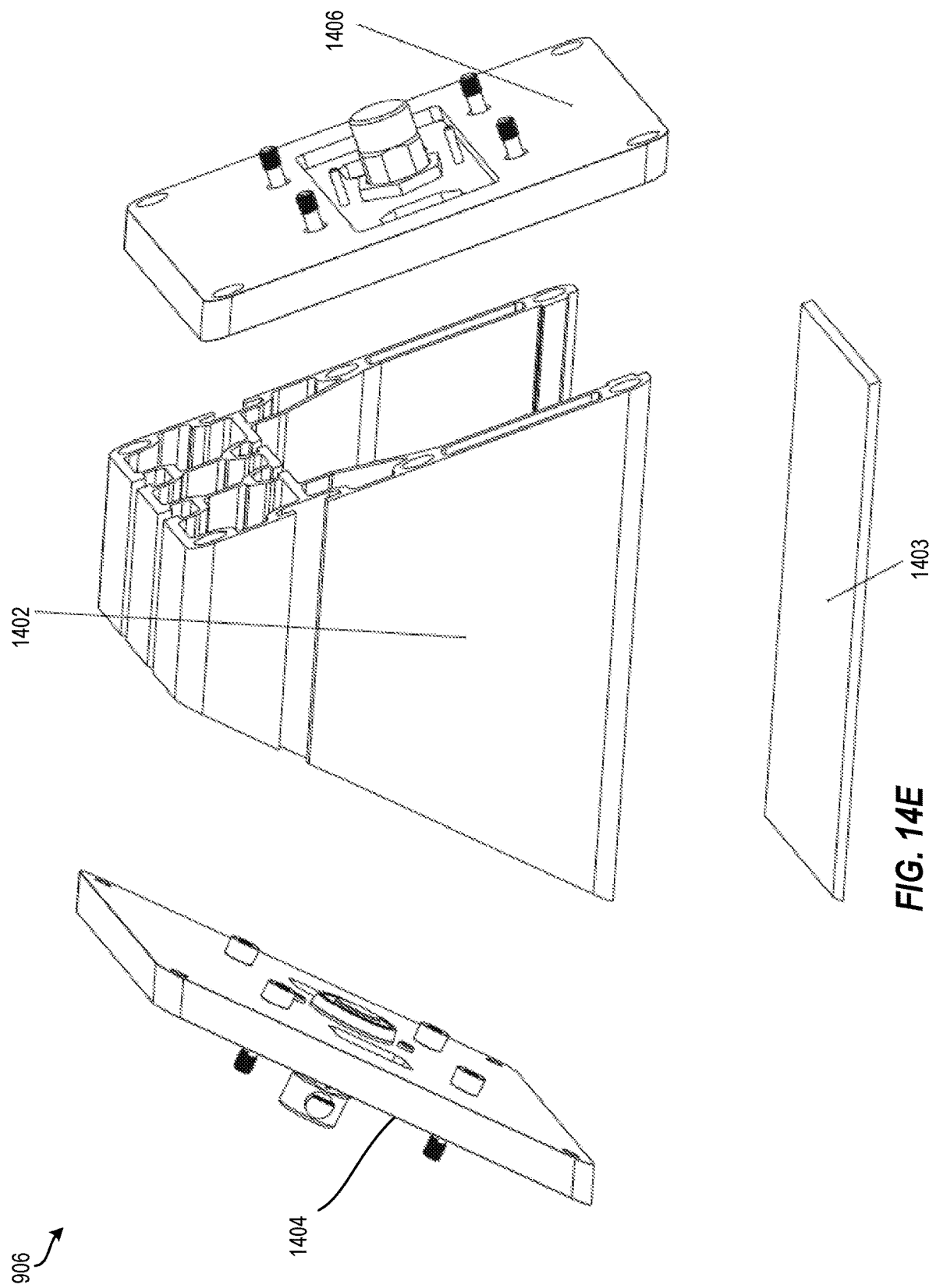
FIG. 14E depicts an exploded view the example joint link segment of FIG. 14B according to an embodiment.
Figure 14F:
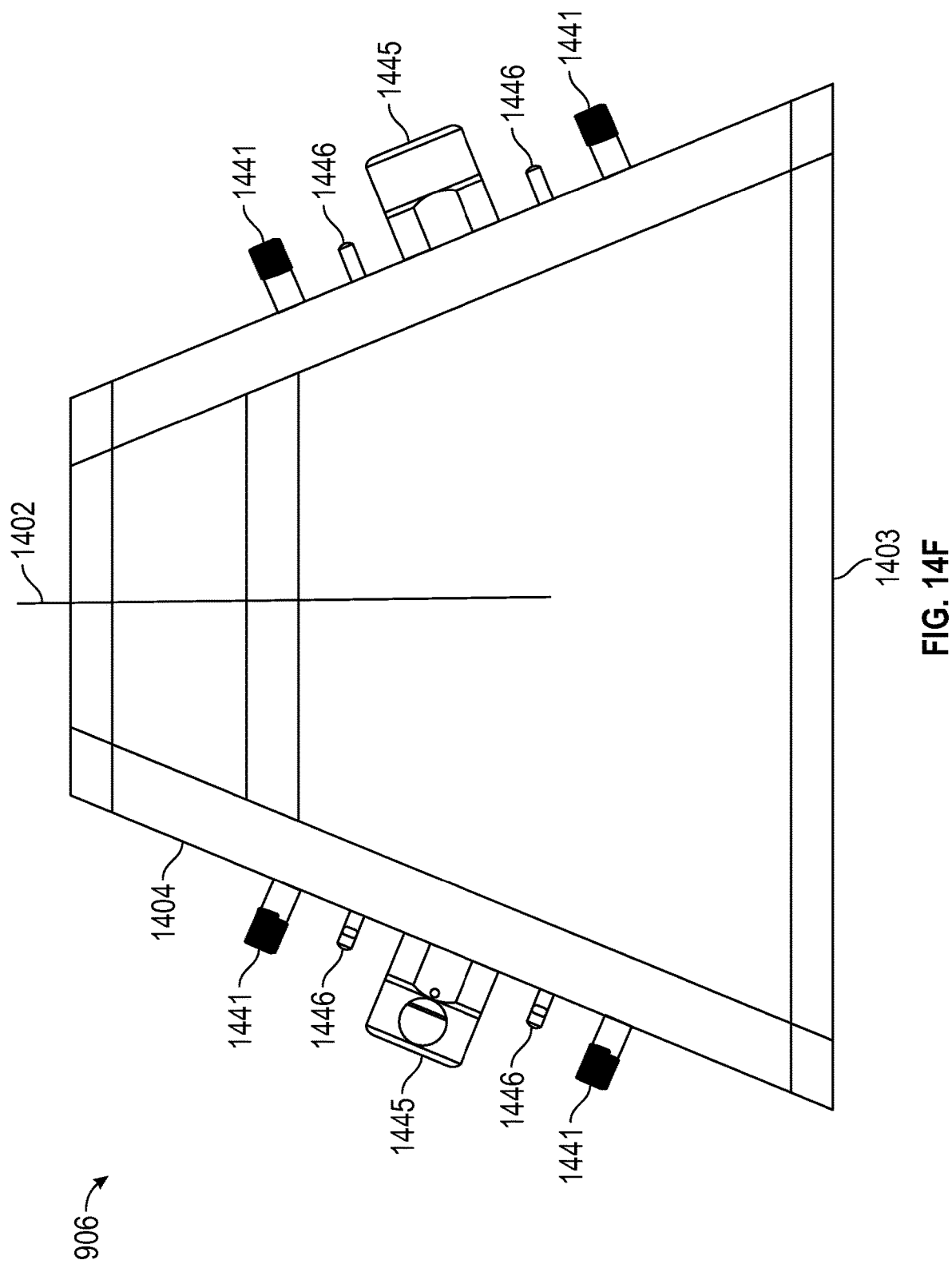
FIG. 14F depicts a side view of the example joint link segment of FIG. 14B according to an embodiment.

FIG. 14A depicts an isometric view an example joint link segment 906 of one of the joint link segments of FIG. 9 according to an embodiment. FIG. 14B depicts an isometric view of another example joint link segment 906 according to an embodiment. FIG. 14C depicts an exploded view the example joint link segment 906 of FIG. 14A according to an embodiment, and FIG. 14D depicts a side view of the example joint link segment 906 of FIG. 14A according to an embodiment. FIG. 14E depicts an exploded view the example joint link segment 906 of FIG. 14B according to an embodiment, and FIG. 14F depicts a side view of the example joint link segment 906 of FIG. 14B according to an embodiment.

The joint link segment 906 of FIGS. 14A-14F includes a body portion 1402 (which can include a base portion 1403 (see FIG. 14C)) disposed between a first end portion 1404 and a second end portion 1406. The first end portion 1404 and the second end portion 1406 include mechanical connectors and electrical connectors as discussed herein with reference to FIG. 11. Alignment pins 1446 can also be included to aid in aligning ends of two frame segments. For example, the second end portion 1406 (a mating end) includes two alignment pins 1446, which can be received by corresponding receivers on a receiving end of another frame segment.

In some embodiments, the first end portion 1404 and the second end portion 1406 can both be configured as mating ends and can be received by receiving ends on other frame segments. Conversely, the first end portion 1404 and the second end portion 1406 can both be configured as receiving ends and can receive mating ends of other frame segments. Although these variations are described with reference to the joint link segment 906, such variations are also applicable to measurement device link segments 904, and more generally, to any of the frame segments.

Figure 15:
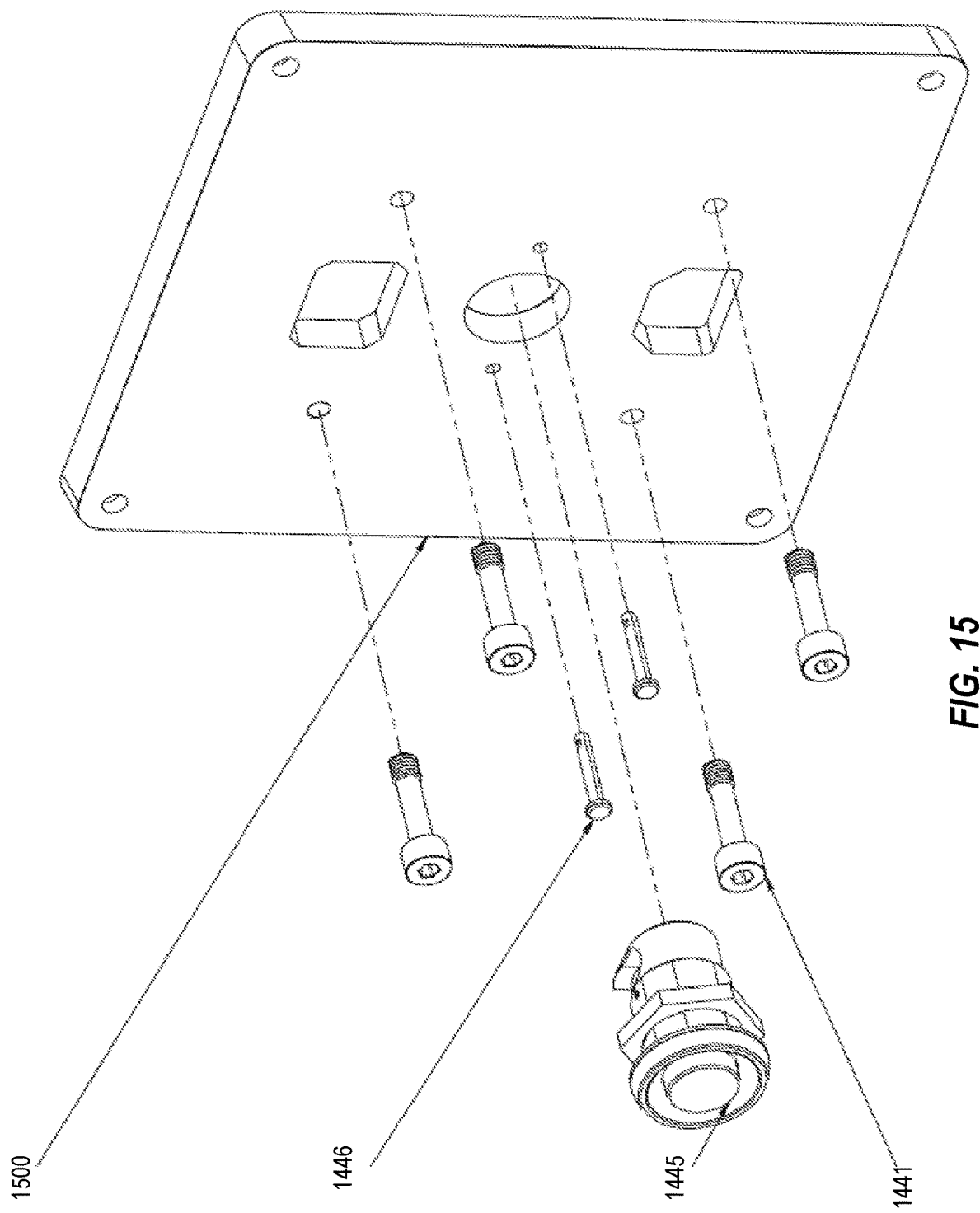
FIG. 15 depicts an unassembled view of a mating end of a frame segment according to an embodiment.

FIG. 15 depicts an exploded view of a mating end 1500 of a frame segment according to an embodiment. The mating end 1400 includes mating mechanical connectors 1441, a mating electrical connector 1445, and alignment pins 1446.

Figure 16:
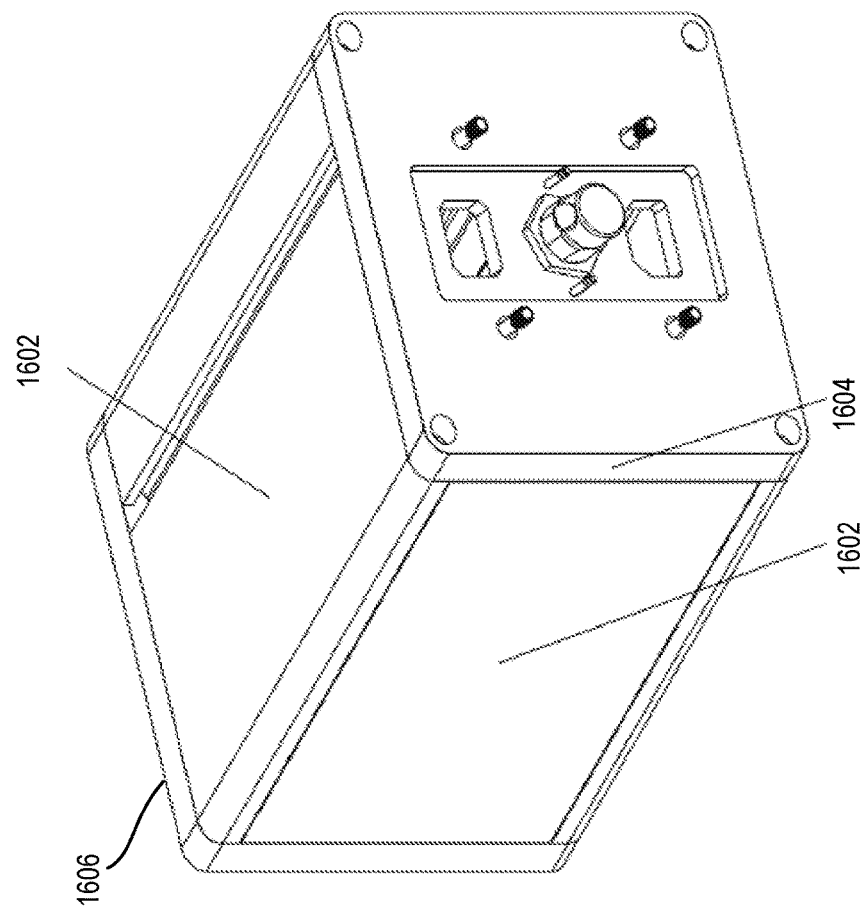
FIG. 16 depicts an isometric view another example configuration of one of the joint link segments of FIG. 9 according to an embodiment.

FIG. 16 depicts an isometric view another example configuration of one of the joint link segments 906 of FIG. 9 according to an embodiment. The example joint link segment 906 depicted in FIG. 16 includes a body portion 1602 (which can include a base portion 1603), a first end portion 1604, and a second end portion 1606.

Figure 17A:
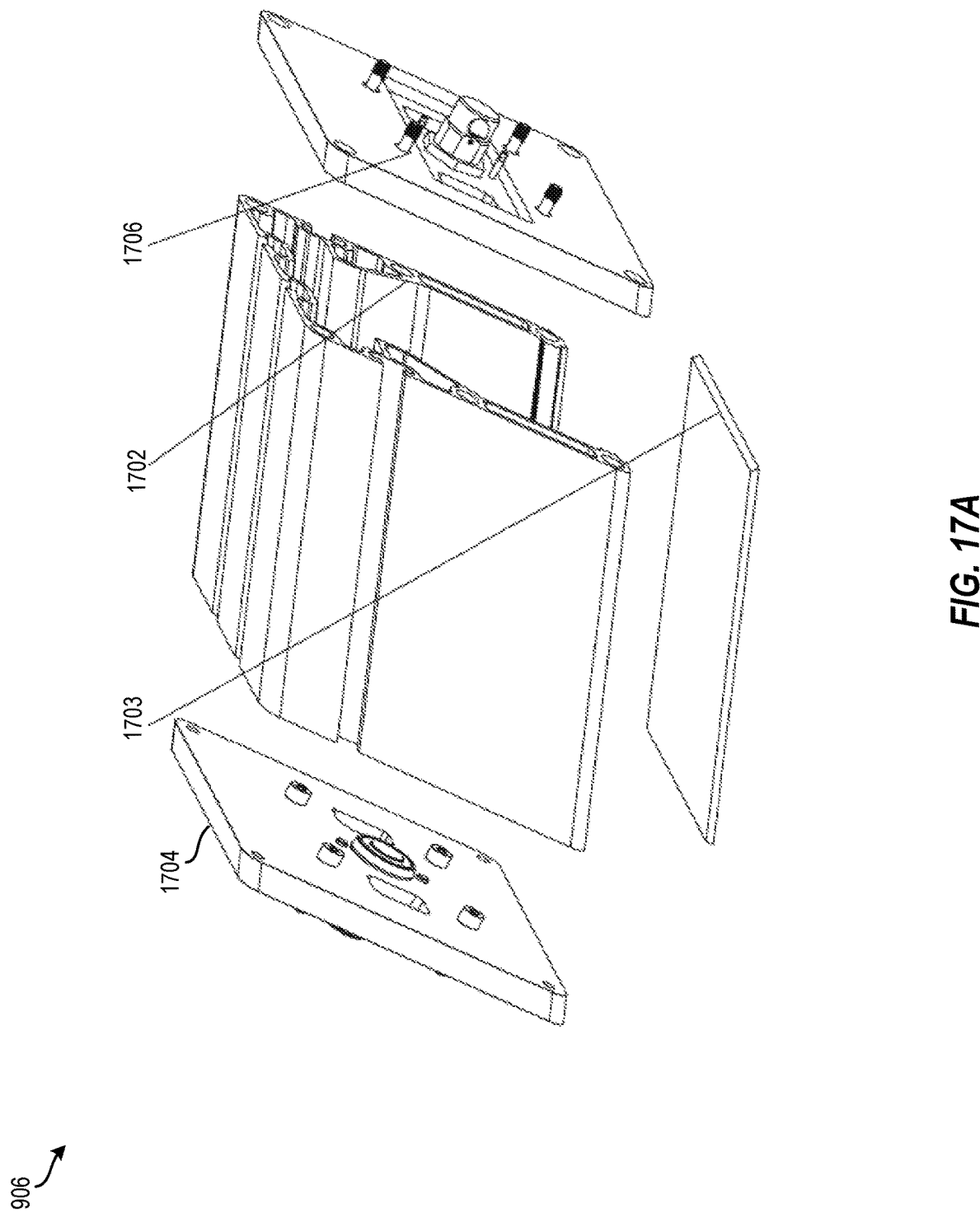
FIG. 17A depicts an exploded view another example configuration of one of the joint link segments of FIG. 9 according to an embodiment.
Figure 17B:
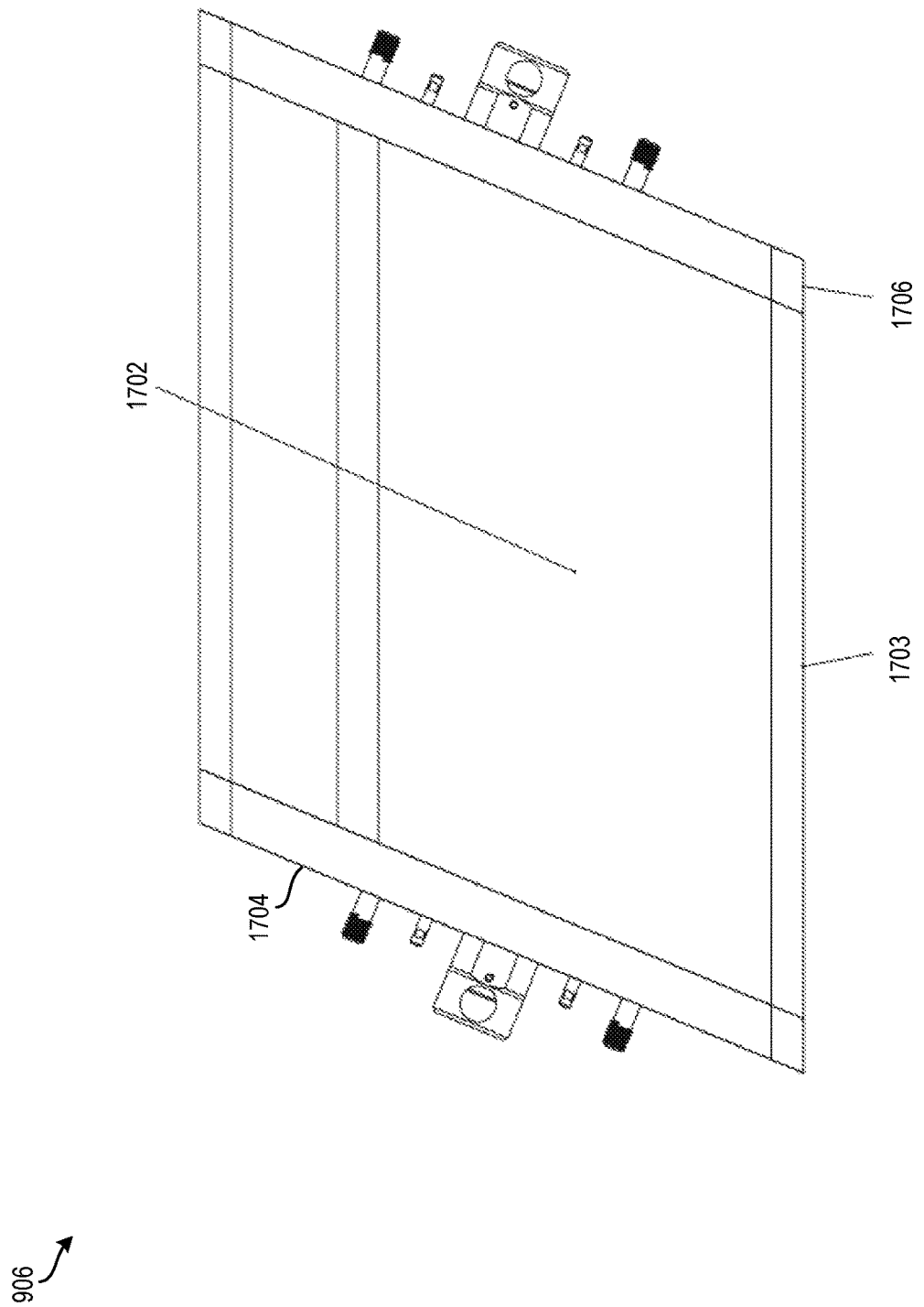
FIG. 17B depicts a side view of the example joint link segment of FIG. 17A according to an embodiment.

FIG. 17A depicts an exploded view another example configuration of one of the joint link segments 906 of FIG. 9 according to an embodiment. FIG. 17B depicts a side view of the example joint link segment 906 of FIG. 17A according to an embodiment. The example joint link segment 906 depicted in FIGS. 17A and 17B includes a body portion 1702 (which can include a base portion 1703), a first end portion 1704, and a second end portion 1706.

FIG. 18 depicts a portion 1800 of a frame of a modular inspection system according to an embodiment. The portion 1800 includes measurement device link segments 1804a, 1804b, 1804c and joint link segments 1806a, 1806c configured and arranged as shown. The measurement device link segment 1804a is electrically and mechanically coupled to the joint link segment 1806a which is electrically and mechanically coupled to the measurement device link segment 1804b in a substantially 45-degree relationship. The measurement device link segment 1804b is electrically and mechanically coupled to the joint link segment 1806b, which is electrically and mechanically coupled to the measurement device link segment 1804c in a substantially 45-degree relationship. It should be appreciated that the measurement device link segments 1804a, 1804c are at a substantially 90-degree relationship to one another. In the example of FIG. 18, a field-of-view of a measurement device of the measurement device link segment 1804a overlaps a field-of-view of a measurement device of the measurement device link segment 1804b. Similarly, a field-of-view of a measurement device of the measurement device link segment 1804c overlaps a field-of-view of a measurement device of the measurement device link segment 1804b. Other configurations are also possible, and the example configuration of FIG. 18 is merely for illustrative purposes.

For example, FIG. 19 depicts a portion 1900 of a frame of a modular inspection system according to an embodiment. The portion 1900 includes measurement device link segments 1904a, 1904b and a joint link segment 1906 configured and arranged as shown in a substantially straight relationship to one another. The measurement device link segment 1904a is electrically and mechanically coupled to the joint link segment 1906 which is electrically and mechanically coupled to the measurement device link segment 1904b. In the example of FIG. 19, a field-of-view of a measurement device of the measurement device link segment 1904a overlaps a field-of-view of a measurement device of the measurement device link segment 1904b. Other configurations are also possible, and the example configuration of FIG. 19 is merely for illustrative purposes.

FIG. 20 is a list of elements in a method 2000 for arranging frame segments to form a modular inspection system according to an embodiment. A method element 2002 of the method 2000 includes arranging a plurality of frame segments to form a first frame (e.g., the frame 902) having a first shape. The plurality of frame segments can include a plurality of measurement device link segments (e.g., the measurement device link segments 904) and a plurality of joint link segments (e.g., the joint link segments 906). Each of the plurality of measurement device link segments can include a measurement device (e.g., the measurement device 1220) which together form a plurality of measurement devices having a field of view within or adjacent to the first frame. Each of the plurality of measurement devices is operable to measure three-dimensional (3D) coordinates for a plurality of points on an object as described herein.

A method element 2004 of the method 2000 includes establishing a computer communications network among the plurality of frame segments when the frame segments are arranged in the first shape to transmit data to a computing device (e.g., the computing device 910). A method element 2006 of the method 2000 includes receiving, by the computing device, data from the plurality of measurement devices via the network established by the plurality of frame segments when the plurality of frame segments are arranged in the first shape. A method element 2008 of the method 2000 includes an optional rearranging the plurality of frame segments to form a second frame having a second shape. It should be appreciated that the rearranging of the frame segments provides flexibility in allowing different objects to be inspected.

In some examples, the method 2000 further includes reestablishing the network among the plurality of frame segments when the plurality of frame segments are arranged in the second shape to transmit data to the computing device. Such examples of the method 2000 further include receiving, by the computing device, data from the plurality of measurement devices via the network reestablished by the plurality of frame segments when the plurality of frame segments are arranged in the second shape.

In some examples, each of the plurality of frame segments comprises an electrical path to establish (or reestablish) the network. In some examples, each of the plurality of frame segments comprises an optical path to establish the network. In yet additional examples, the network can be established (or reestablished) by a combination of electrical paths and optical paths. As used herein, the term electrical paths describes the paths that data signals travel through cabling, networking equipment, etc. Similarly, the term optical paths describe the paths that light signals travel through cabling, networking equipment, etc. The network, utilizing electrical paths and/or optical paths, enables the transmission of data, such as from a measurement device to a computing device, from one measurement device to another measurement device, from the computing device to a measurement device, and the like. The network can be, for example, a gigabit network enabled to transmit data at speeds of approximately one gigabit per second (Gbps). The network can also be, for example, a ten gigabit network enabled to transmit data at speeds of approximately 10 Gbps. It should be appreciated that other network speeds can be supported and are within the scope of the disclosed embodiments.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A modular inspection system for measuring an object, the modular inspection system comprising:
a plurality of frame segments, the plurality of frame segments being configured to mechanically couple together to form a frame, the plurality of frame segments comprising a plurality of measurement device link segments, each of the plurality of measurement device link segments comprising a measurement device which together form a plurality of measurement devices having a field of view within or adjacent to the frame, each of the plurality of measurement devices being operable to measure three-dimensional (3D) coordinates for a plurality of points on the object; and
a computing device to receive data from the plurality of measurement devices via a network established by the plurality of measurement device link segments,
wherein a first measurement device link segment of the plurality of measurement device link segments comprises a first network switch electrically coupled to the measurement device of the first measurement device link segment,
wherein a second measurement device link segment of the plurality of measurement device link segments comprises a second network switch electrically coupled to the measurement device of the second measurement device link segment, and
wherein the first measurement device link segment comprises a first body portion disposed between a first end and a second end, wherein the second measurement device link segment comprises a second body portion disposed between a third end and a fourth end, wherein at least the first end comprises a first electrical coupling, wherein at least the third end comprises a second electrical coupling, and wherein the first electrical coupling is configured to couple to the second electrical coupling.

2. The modular inspection system of claim 1, wherein the plurality of frame segments further comprise a joint link segment to mechanically couple between two measurement device link segments.

3. The modular inspection system of claim 2, wherein the joint link segment comprises an electrical path to electrically couple the two measurement device link segments to enable data to be transmitted from a first of the two measurement device link segments to a second of the two measurement device link segments.

4. The modular inspection system of claim 2, wherein the joint link segment is configured to mechanically couple between the two measurement device link segments to cause the two measurement device link segments to be at a substantially 90-degree relationship to one another.

5. The modular inspection system of claim 2, wherein the joint link segment is configured to mechanically couple between the two measurement device link segments to cause the two measurement device link segments to be at a substantially 45-degree relationship to one another.

6. The modular inspection system of claim 2, wherein the joint link segment is configured to mechanically couple between the two measurement device link segments to cause the two measurement device link segments to be at a substantially straight relationship to one another.

7. The modular inspection system of claim 1, wherein each of the plurality of measurement devices is operable to measure the 3D coordinates for the plurality of points on the object as the object passes through or adjacent to the frame from a first position to a second position.

8. The modular inspection system of claim 1, wherein the computing device comprises one or more processors that execute computer instructions for determining a location of an anomaly on a surface of the object based at least in part on the data received from the plurality of measurement devices.

9. The modular inspection system of claim 1, wherein the first network switch is electrically coupled to the measurement device of the first measurement device link segment by at least two electrical cables.

10. The modular inspection system of claim 1, wherein the first network switch is electrically coupled to the computing device.

11. The modular inspection system of claim 1, wherein the network comprises at least the first network switch and the second network switch.

12. The modular inspection system of claim 1, wherein at least the first end comprises a first mechanical coupling, wherein at least the third end comprises a second mechanical coupling, and wherein the first mechanical coupling is configured to couple to the second mechanical coupling.

13. The modular inspection system of claim 1, wherein at least one of the plurality of measurement device link segments comprises at least one fan.

14. The modular inspection system of claim 1, wherein each of the plurality of frame segments comprise an electrical path to established the network.

15. The modular inspection system of claim 1, wherein each of the plurality of frame segments comprise an optical path to establish the network.

* * * * *